(12) United States Patent
Toyoda et al.

(10) Patent No.: US 10,635,443 B2
(45) Date of Patent: Apr. 28, 2020

(54) APPARATUS AND METHOD TO EMULATE A SEQUENCE OF INSTRUCTIONS VIA PARALLEL PROCESSORS

(71) Applicant: FUJITSU LIMITED, Kawasaki-shi, Kanagawa (JP)

(72) Inventors: Yuta Toyoda, Kawasaki (JP); Shigeki Itou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 511 days.

(21) Appl. No.: 15/209,214

(22) Filed: Jul. 13, 2016

(65) Prior Publication Data

US 2017/0024211 A1 Jan. 26, 2017

(30) Foreign Application Priority Data

Jul. 23, 2015 (JP) ................................ 2015-146083

(51) Int. Cl.
*G06F 9/30* (2018.01)
*G06F 9/38* (2018.01)
*G06F 9/455* (2018.01)

(52) U.S. Cl.
CPC ........ *G06F 9/30174* (2013.01); *G06F 9/3824* (2013.01); *G06F 9/3834* (2013.01); *G06F 9/455* (2013.01)

(58) Field of Classification Search
None
See application file for complete search history.

(56) References Cited

U.S. PATENT DOCUMENTS

| 6,412,043 B1 * | 6/2002 | Chopra | G06F 9/30032 711/118 |
| 7,873,814 B1 * | 1/2011 | Cohen | G06F 9/30134 712/209 |

FOREIGN PATENT DOCUMENTS

| JP | 4-277840 | 10/1992 |
| JP | 7-13805 | 1/1995 |
| JP | 7-13943 | 1/1995 |
| JP | 2007-334392 | 12/2007 |

* cited by examiner

*Primary Examiner* — Corey S Faherty
(74) *Attorney, Agent, or Firm* — Staas & Halsey LLP

(57) ABSTRACT

Instruction-execution processors each execute a first instruction. A control processor converts a second instruction to be emulated into the first instruction, and enters the converted first instruction into the instruction-execution processors. In a parallel-execution period, each instruction-execution processor executes a writing-access instruction or a reading-access instruction to a memory, suspends writing of data into the memory caused by the writing-access instruction, and retains an execution history of the writing-access instruction and the reading-access instruction. The control processor selects one of instruction-execution processors in which addresses of the memory access instructions conflict with each other, causes the selected instruction-execution processor to complete the writing of the data into the memory, enters first instructions to be executed in a next parallel-execution period into the selected instruction-execution processor, and causes another instruction-execution processor to re-execute first instructions executed by the other instruction-execution processors in the parallel-execution period, in the next parallel-execution period.

17 Claims, 11 Drawing Sheets

APPARATUS AND METHOD TO EMULATE A SEQUENCE OF INSTRUCTIONS VIA PARALLEL PROCESSORS

CROSS-REFERENCE TO RELATED APPLICATION

This application is based upon and claims the benefit of priority of the prior Japanese Patent Application No. 2015-146083, filed on Jul. 23, 2015, the entire contents of which are incorporated herein by reference.

FIELD

The embodiments discussed herein are related to apparatus and method to emulate a sequence of instructions via parallel processors.

BACKGROUND

An information processing apparatus with a plurality of processors being operated in parallel attains the more improved processing efficiency than that with a single processor being operated. In information processing apparatuses of this type, the reproducibility of a program is secured by recording a history of the plurality of processors that have accessed a shared memory, and causing each processor to wait to access the shared memory in accordance with the history when the program is re-executed (for example, see Japanese Laid-open Patent Publication No. 07-13805). Moreover, the reproducibility of a program is secured by recording the order of a plurality of processors that have accessed a shared memory, and permitting the processors to access the shared memory in accordance with the order when the program is re-executed (for example, see Japanese Laid-open Patent Publication No. 07-13943).

In a case where instruction processing and data transfer processing that is executed asynchronous to the instruction processing are executed in parallel with each other, the reproducibility of a program is secured by dividing a transfer period of the data into a predetermined number of terms, and synchronizing the instruction processing with the data transfer processing for each term (for example, see Japanese Laid-open Patent Publication No. 2007-334392). Moreover, in a simulator that simulates executions of a synchronous instruction and an asynchronous instruction, the reproducibility of the execution of the asynchronous instruction is secured by executing data transfer based on the asynchronous instruction during a period when a predetermined number of synchronous instructions, which is a condition set in advance, are executed (for example, see Japanese Laid-open Patent Publication No. 04-277840).

SUMMARY

According to an aspect of the invention, an apparatus includes a plurality of instruction execution processors each configured to execute first instructions included in a first instruction set, a memory accessible by each instruction execution processor, and a control processor configured to control a emulation operation including: converting second instructions to be emulated, included in a second instruction set different from the first instruction set, into first instructions included in the first instruction set, and entering the converted first instructions into the plurality of instruction execution processors. Each instruction execution processor is configured to execute, out of the first instructions that are entered from the control processor, a writing access instruction to perform a writing access to the memory or a reading access instruction to perform a reading access to the memory, suspend writing of data into the memory caused by the writing access instruction executed in a parallel execution period in which each instruction execution processor executes first instructions in parallel with other instruction execution processors, and retain an execution history of a memory access instruction including the writing access instruction or the reading access instruction, which has been executed in the parallel execution period. The control processor is configured to: select, based on the execution histories of the plurality of instruction execution processors, a first instruction execution processor from among a group of instruction execution processors in which addresses of the memory access instructions conflict with each other, after the parallel execution period, cause the selected first instruction execution processor to complete the writing of the data into the memory, based on the writing access instruction that has been executed by the first instruction execution processor in the parallel execution period, enter first instructions to be executed in a next parallel execution period into the first instruction execution processor, and cause a second instruction execution processor other than the first instruction execution processor, to re-execute first instructions that have been executed by the second instruction execution processor in the parallel execution period, in the next parallel execution period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An emulator that emulates an operation of a processor executing a program is capable of performing high-speed emulation by causing a plurality of processors to execute instructions included in a program that is a target of debugging in parallel, compared with a case where a program is successively processed. In emulators of this type, securing the reproducibility of a program to be executed is important so as to debug the program with high efficiency.

However, in the emulators, when a plurality of processors execute instructions included in a program that is a target of debugging in parallel, there is a possibility that the execution order of the instructions executed by the plurality of processors may vary for every time the program is executed. When the execution order of the instructions is not fixed, a case where a failure appears and a case where no failure appear occur when the program is being executed, lowering the debug efficiency compared with that in a case where the execution order of the instructions is fixed.

In an aspect, an information processing apparatus and a control method of an information processing apparatus in the embodiments discussed herein aim to keep, when multiple instruction execution processors execute instructions included in a program in parallel, the execution order of the instructions from varying, and improve the debug efficiency of the program.

Hereinafter, embodiments will be described using the drawings.

Figure 1:
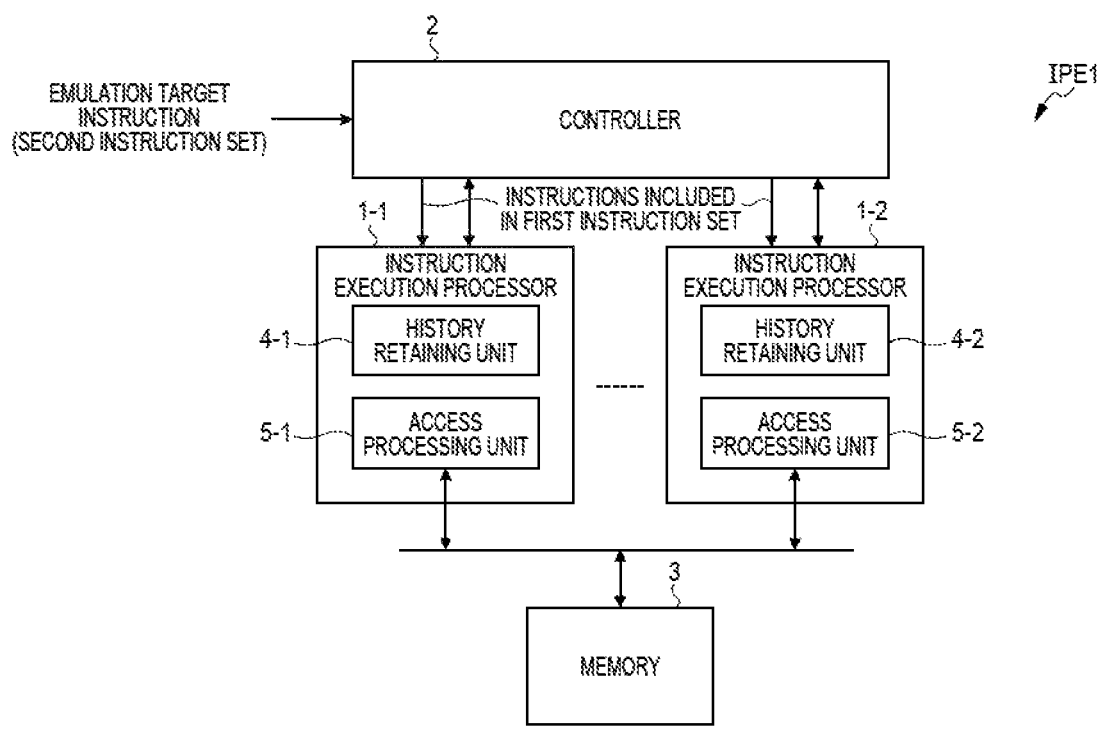
FIG. 1 is a diagram illustrating an example of an embodiment of an information processing apparatus and a control method of the information processing apparatus.

FIG. 1 illustrates an embodiment of an information processing apparatus and a control method of the information processing apparatus. An information processing apparatus IPE1 illustrated in FIG. 1 includes multiple instruction execution processors 1 (1-1 and 1-2) that respectively execute instructions, a controller 2 that controls the execution of the instructions of the instruction execution processors 1-1 and 1-2, and a memory 3 that is accessed in common by the instruction execution processors 1-1 and 1-2. For example, the instruction execution processor 1 is a processor core, and the memory 3 is a main memory connected to the instruction execution processors 1 via a bus. The controller 2 receives emulation target instructions included in a second instruction set that is different from a first instruction set executed by each of the instruction execution processors 1-1 and 1-2, and converts the received emulation target instructions into instructions included in the first instruction set. For example, an instruction included in the second instruction set is an instruction executed by another processor being developed. Further, the controller 2 enters the converted instructions into the instruction execution processors 1-1 and 1-2 to control emulation operations that cause the instruction execution processors 1-1 and 1-2 to execute emulation target instructions that are instructions included in the second instruction set, and are simulatively executed in the information processing apparatus IPE1. In other words, the information processing apparatus IPE1 functions as an emulator that emulates an operation of another processor for executing a program, and is used for debugging the program. Further, the number of the instruction execution processors 1 is not limited to the number in the example illustrated in FIG. 1, but may be more than two.

Each instruction execution processor 1 includes a history retaining unit 4 (4-1, 4-2) and an access processing unit 5 (5-1, 5-2). The history retaining unit 4 retains an execution history of a memory access instruction (a writing access instruction or a reading access instruction) executed by each instruction execution processor 1 in a parallel execution period illustrated in FIG. 2. The instruction execution processor 1 including the history retaining unit 4 executes storing the execution history in the history retaining unit 4. The parallel execution period is a period when the multiple instruction execution processors 1 execute instructions in parallel included in the first instruction set corresponding to a debug target program (emulation target program) that is described by instructions included in the second instruction set.

The access processing unit 5 accesses the memory 3 by executing, out of the instructions that are entered from the controller 2, a writing access instruction to perform a writing access to the memory 3 or a reading access instruction to perform a reading access to the memory 3. Note that, the access processing unit 5 suspends writing of data to the memory 3 based on a writing access instruction, in the parallel execution period, and stores information indicating the suspended writing access instruction in the history retaining unit 4.

The controller 2 determines whether addresses of the memory access instructions having been executed by the multiple instruction execution processors 1 in the parallel execution period conflict with each other, based on the execution histories retained in the history retaining unit 4, in a determination period after the parallel execution period. When the addresses of the memory access instructions conflict with each other, the controller 2 selects one of the instruction execution processors 1 in which the addresses of the memory access instructions conflict with each other, based on a predetermined rule. In addition, the controller 2 selects the instruction execution processor 1 in which the memory access instruction does not conflict. Hereinafter, the conflict of the addresses of the memory access instructions is also referred to as a conflict of the memory access instructions.

For example, assumed is a case where, out of five instruction execution processors 1, memory access instructions conflict with one another for the two instruction execution processors 1, whereas memory access instructions do not conflict with one another for the remaining three instruction execution processors 1. In this case, the controller 2 selects either one of the instruction execution processors 1 in which the memory access instructions conflict with each other, and selects the remaining three instruction execution processors 1.

The controller 2 causes the selected instruction execution processors 1 to complete writing of the data having been suspended to be written, into the memory 3, and enters new instructions that are caused to be executed in the next parallel execution period, to the selected instruction execution processors 1. Moreover, the controller 2 causes the other instruction execution processor 1 that is not selected out of the instruction execution processors 1 in which the memory access instructions conflict with each other, to re-execute the instructions having been executed in the parallel execution period, in the next parallel execution period. In other words, the instruction that the other instruction execution processor 1 being not selected has executed in the parallel execution period is suspended.

The controller 2 may be configured to include a processor (an instruction execution processor) to perform the functions of the controller 2 described above.

Figure 2:
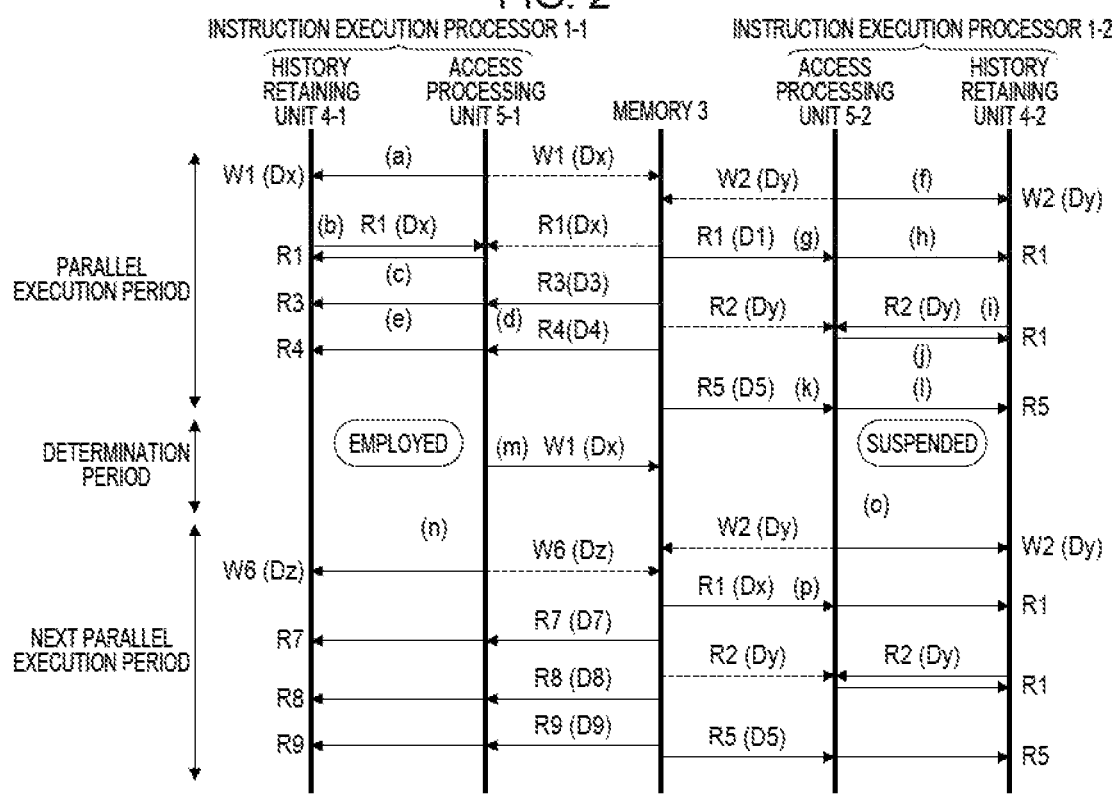
FIG. 2 is a diagram illustrating an example of an operation of the information processing apparatus, according to an embodiment.

FIG. 2 illustrates an example of an operation of the information processing apparatus IPE1 illustrated in FIG. 1. In other words, FIG. 2 illustrates an example of a control method of the information processing apparatus IPE1. The controller 2 illustrated in FIG. 1 repeatedly executes processing in the parallel execution period and processing in the determination period, and enters instructions to each instruction execution processor 1 before the parallel execution period is started. For example, the numbers of the instructions entered into each of the instruction execution processors 1-1 and 1-2 (in other words, the numbers of instructions that each of the instruction execution processors 1-1 and 1-2 executes in the parallel execution period) are the same as each other.

In the example illustrated in FIG. 2, the controller 2 enters a writing access instruction W1 and reading access instructions R1, R3, and R4 to the instruction execution processor 1-1, and enters a writing access instruction W2 and reading access instructions R1, R2, and R5 to the instruction execution processor 1-2. A number suffixed to a symbol W representing a writing access instruction indicates a writing address, and a number suffixed to a symbol R representing a reading access instruction indicates a reading address. Characters within parentheses subsequent to the symbol W of the writing access instruction indicate writing data, and characters within parentheses subsequent to the symbol R of the reading access instruction indicate reading data.

Arrows connected to the access processing units 5-1 and 5-2 indicate flows of data or information. Further, an arrow of dashed line connected to the memory 3 indicates that an access to the memory 3 based on the memory access instruction is suspended or omitted. Further, although the controller 2 enters also a computation instruction and the like other than the memory access instruction to the instruction execution processor 1 in an actual operation, FIG. 2 illustrates only memory access instructions W and R for easy understanding of an explanation.

In the parallel execution period, the instruction execution processor 1-1 suspends writing of data Dx into the memory 3 based on the writing access instruction W1, and stores information indicating the writing access instruction W1 in the history retaining unit 4-1 ((a) in FIG. 2). The information indicating the writing access instruction W1 includes a writing address and writing data Dx. Writing of data into the memory 3 that is a shared resource is suspended in the parallel execution period to avoid the influence of an operation by one instruction execution processor 1 on operations by other instruction execution processors 1.

A reading address included in the reading access instruction R1 that the instruction execution processor 1-1 executes next is identical with the writing address included in the writing access instruction W1. In this case, the instruction execution processor 1-1 reads the data Dx from the history retaining unit 4-1, instead of accessing the memory 3 based on the reading access instruction R1 ((b) in FIG. 2). Further, the instruction execution processor 1-1 stores information indicating the reading access instruction R1 in the history retaining unit 4-1 ((c) in FIG. 2). The information indicating the reading access instruction R1 includes the reading address.

Reading addresses included in the reading access instructions R3 and R4 that the instruction execution processor 1-1 executes are different from the writing address included in the writing access instruction W1 that has been retained in the history retaining unit 4-1. Accordingly, the instruction execution processor 1-1 accesses the memory 3 based on each of the reading access instructions R3 and R4, and reads data D3 and data D4 from the memory 3 ((d) in FIG. 2). Moreover, the instruction execution processor 1-1 stores information indicating each of the reading access instructions R3 and R4 in the history retaining unit 4-1 ((e) in FIG. 2).

Meanwhile, the instruction execution processor 1-2 suspends writing of data Dy into the memory 3 based on the writing access instruction W2, and stores information indicating the writing access instruction W2 in the history retaining unit 4-2 ((f) in FIG. 2). The reading address included in the reading access instruction R1 that the instruction execution processor 1-2 executes next is different from a writing address included in the writing access instruction W2 that has been retained in the history retaining unit 4-2. Accordingly, the instruction execution processor 1-2 accesses the memory 3 based on the reading access instruction R1, and reads data D1 (expected value) from the memory 3 ((g) in FIG. 2). Further, the instruction execution processor 1-2 stores information indicating the reading access instruction R1 in the history retaining unit 4-2 ((h) in FIG. 2).

A reading address included in the reading access instruction R2 that the instruction execution processor 1-2 executes is identical with the writing address included in the writing access instruction W2. Accordingly, the instruction execution processor 1-2 reads the data Dy from the history retaining unit 4-2, instead of accessing the memory 3 based on the reading access instruction R2 ((i) in FIG. 2). Further, the instruction execution processor 1-2 stores information indicating the reading access instruction R2 in the history retaining unit 4-2 ((j) in FIG. 2).

A reading address included in the reading access instruction R5 that the instruction execution processor 1-2 executes is different from the writing address included in the writing access instruction W1 that has been retained in the history retaining unit 4-2. Accordingly, the instruction execution processor 1-2 accesses the memory 3 based on the reading access instruction R5, and reads data D5 from the memory 3 ((k) in FIG. 2). Moreover, the instruction execution processor 1-2 stores information indicating the reading access instruction R5 in the history retaining unit 4-2 ((l) in FIG. 2). The parallel execution period is then ended.

Next, in a determination period, the controller 2 determines, out of the instructions that are respectively executed by the instruction execution processors 1-1 and 1-2, the presence or absence of the instructions that conflict with each other, based on the information retained in the history retaining units 4-1 and 4-2. For example, the controller 2 determines that "a conflict is present" as for the multiple instruction execution processors 1 that have executed writing access instructions each including the same writing address. Moreover, the controller 2 determines that "a conflict is present" as for the instruction execution processor 1 that has executed a reading access instruction including a reading address identical with the writing address included in the writing access instruction that another instruction execution processor 1 has executed.

In the example illustrated in FIG. 2, the controller 2 determines that the instruction execution processor 1-1 that has executed the writing access instruction W1 and the instruction execution processor 1-2 that has executed the reading access instruction R1 conflict with each other. The controller 2 decides to employ the instruction that the instruction execution processor 1-1 has executed in the parallel execution period, and decides to suspend the instruction that the instruction execution processor 1-2 has executed in the parallel execution period, based on a predetermined rule. In other words, the controller 2 selects one of the multiple instruction execution processors 1 which conflict with one another, based on the predetermined rule.

For example, the controller 2 selects, out of the multiple instruction execution processors 1 which conflict with one another, one instruction execution processor 1 whose number of parallel execution periods for which the execution of instructions has been suspended is greater than those of the other instruction execution processors 1. Moreover, in a case where the multiple instruction execution processors 1 which conflict with one another have the same number of parallel execution periods for which the execution of instructions has been suspended in the past, the controller 2 decides one instruction execution processor 1 to be selected, by using an arbiter logic having the reproducibility, such as a round robin logic. Further, the controller 2 may select one instruction execution processor 1, out of the multiple instruction execution processors 1 in which the instructions conflict with one another, by using an arbiter logic having the reproducibility, such as a round robin logic, without using the number of the suspended parallel execution periods.

The controller 2 then causes the instruction execution processor 1-1 to execute the writing access instruction W1 in the determination period so as to execute the writing of the data Dx to the memory 3 that the selected instruction execution processor 1-1 has suspended ((m) in FIG. 2). As for the instruction execution processor 1-2 in which the executed instruction is suspended, the instruction is treated as an instruction that has not being executed, and an execution result of the instruction and information retained in the history retaining unit 4-2 are abandoned. This makes a state of the instruction execution processor 1-2 return to a state thereof before the parallel execution period is started.

Thereafter, the controller 2 enters a writing access instruction W6 and reading access instructions R7, R8, and R9 to be executed in a next parallel execution period, into the instruction execution processor 1-1, and directs the instruction execution processor 1-2 to re-execute the instructions having been executed in the parallel execution period, in the next parallel execution period. The instruction execution processor 1-1 then executes the writing access instruction W6 and the reading access instructions R7, R8, and R9 in the next parallel execution period ((n) in FIG. 2). The instruction execution processor 1-2 executes again the writing access instruction W2 and the reading access instructions R1, R2, and R5 ((o) in FIG. 2). Meanwhile, in a case where no instruction execution processors 1 which conflict with each other are present, the controller 2 enters new instructions to all the instruction execution processors 1. In a case where multiple instruction execution processors 1 which do not conflict with one another are present, instructions included in a debug target program is executed by the multiple instruction execution processors 1. This improves the execution efficiency of the program compared with a case where the program is executed by a single instruction execution processor 1.

The reading address included in the reading access instruction R1 that the instruction execution processor 1-2 executes "in the next parallel execution period" illustrated in FIG. 2 is different from the writing address included in the writing access instruction W2 that has been retained in the history retaining unit 4-2. Accordingly, the instruction execution processor 1-2 accesses the memory 3 based on the reading access instruction R1, and reads the data Dx (different from the expected value D1) that the instruction execution processor 1-1 has written into the memory 3 in the first previous parallel execution period, from the memory 3 ((p) in FIG. 2). In other words, the information processing apparatus IPE1 detects a failure of the program. As for a normal program, exclusive processing is executed in the instruction execution processors 1 so that data different from the expected value is not read from the memory 3, however, the program may include a failure because the operations illustrated in FIG. 2 are executed when the program is being debugged.

In this manner, in the embodiment illustrated in FIGS. 1 and 2, one of the multiple instruction execution processors 1 which conflict with one another is selected based on the predetermined rule, so that the same instruction execution processor 1 is consistently selected as the instruction execution processor 1 in which the execution of the instructions is employed, in each of the parallel execution periods. This makes the execution order of the instructions included in a program be consistently the same, and secures the reproducibility of the program. In addition, each of the instruction execution processors 1-1 and 1-2 executes the same number of instructions in the parallel execution period, allowing the number of the instructions to be executed in the parallel execution period to be consistent, independently of an operation environment in which a debug target program is executed. As a result, the reproducibility of the program is secured independently of the operation environment in which the debug target program is executed.

In the example illustrated in FIG. 2, the controller 2 consistently selects one of the conflicted multiple instruction execution processors 1 based on the same rule in the determination period. Accordingly, even in a case where a debug target program is executed a plurality of times, the instruction execution processor 1-2 consistently executes the reading access instruction R1 after the writing access instruction W1 that the instruction execution processor 1-1 has executed. The instruction execution processor 1-2 reads the data Dx that is different from the expected value D1 from the memory 3 every time the instruction execution processor 1-2 executes a program, to allow the information processing apparatus IPE1 to detect a failure of the program every time the information processing apparatus IPE1 executes the program. In other words, in a case where the multiple instruction execution processors 1 execute in parallel the instructions included in the program, the embodiment illustrated in FIGS. 1 and 2 may prevent the execution order of the instructions from being changed, and may improve the debug efficiency of the program.

In contrast, in a case where the multiple instruction execution processors 1 execute the entered instructions in parallel with and independently of each other, there is a possibility that the execution order of the instructions may vary for each program. For example, there is a possibility that the order between the writing access instruction W1(Dx) that the instruction execution processor 1-1 executes and the reading access instruction R1 that the instruction execution processor 1-2 executes may be transposed in accordance with the states of the instruction execution processors 1-1 and 1-2 when executing the programs.

As illustrated in FIG. 2, in a case where the instruction execution processor 1-2 executes the reading access instruction R1 after the instruction execution processor 1-1 has executed the writing access instruction W1(Dx), the data Dx that is different from the expected value D1 is read from the memory 3, so that a failure of the program is detected. On the other hand, in a case where the instruction execution processor 1-2 executes the reading access instruction R1 before the instruction execution processor 1-1 executes the writing access instruction W1(Dx), the expected value D1 is read from the memory 3, so that no failure of the program is detected. Since the case where a failure of the program is detected or the case where no failure of the program is detected occurs every time the program is executed, it may be difficult to find out a place in the program where a cause of the failure is present, lowering the debug efficiency of the program compared with that of the operation in FIG. 2.

Figure 3:
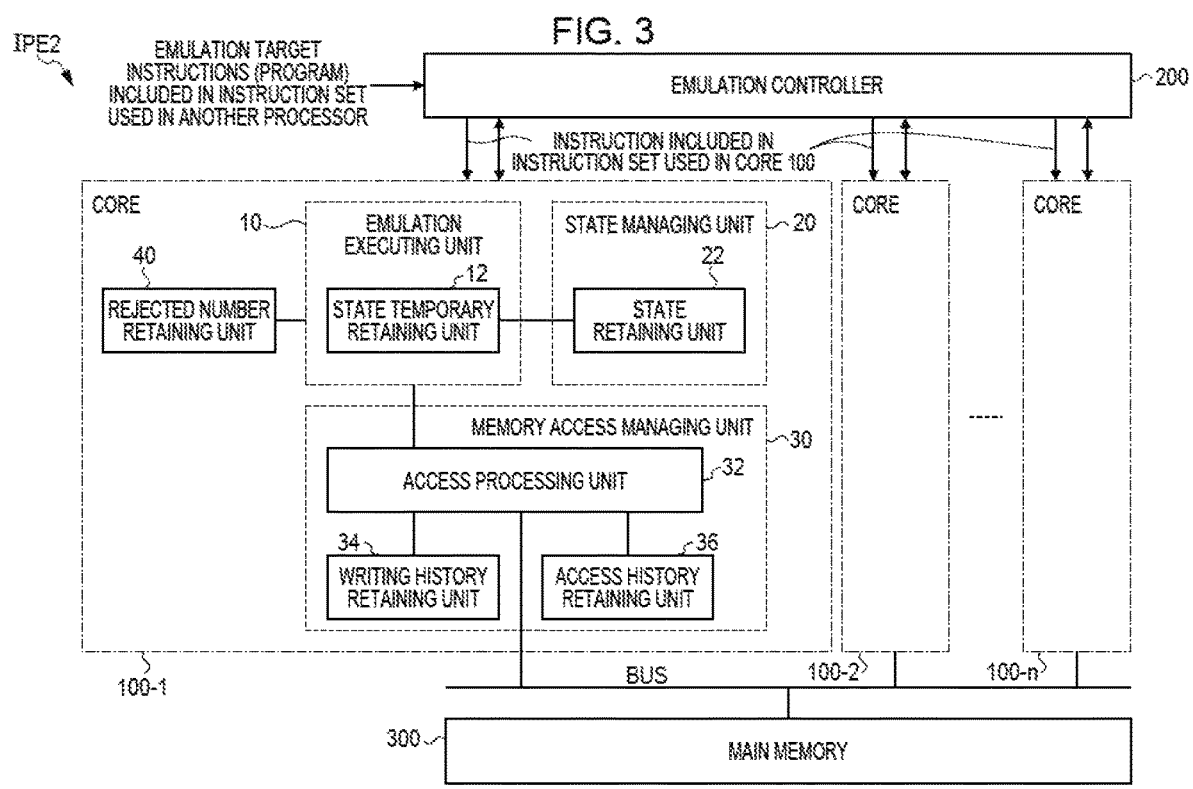
FIG. 3 is a diagram illustrating an example of an embodiment of an information processing apparatus and a control method of the information processing apparatus.

FIG. 3 illustrates another embodiment of an information processing apparatus and a control method of the information processing apparatus. An information processing apparatus IPE2 illustrated in FIG. 3 includes multiple cores 100 (100-1, 100-2, . . . , 100-n) such as processor cores, an emulation controller 200, and a main memory 300. The core 100 is an example of an instruction execution processor that executes instructions, the emulation controller 200 is an example of a controller that controls the execution of the instructions by the multiple cores 100, and the main memory 300 is an example of a memory that is accessed by the multiple cores 100. The emulation controller 200 may be configured to include a processor (a control processor) to control the execution of the instructions by the multiple cores 100

The multiple cores 100 and the emulation controller 200 may be mounted within one chip. The information processing apparatus IPE2 functions as an emulator that emulates an operation of another processor for executing a program or an operation of another information processing apparatus, for example, and is used for debugging the program.

The emulation controller 200 receives, for example, a program described with instructions included in an instruction set that is used by another processor being developed, and converts an instruction included in the received program into an instruction included in an instruction set that is used in the core 100. In other words, an instruction set architecture (ISA) that the core 100 uses is different from an instruction set architecture that another processor uses. The instruction included in the instruction set that is used by another processor is an example of a emulation target instruction that is simulatively executed in the information processing apparatus IPE2. The emulation controller 200 controls a emulation operation in which a emulation target instruction is entered into the core 100 and the core 100 is caused to execute the emulation target instruction.

The emulation controller 200 has a function of distributing instructions that are emulation target instructions included in the debug target program and are converted for the cores 100, to the cores 100 that execute the emulation, out of the multiple cores 100, and causing the multiple cores 100 that execute the emulation to execute the instructions in parallel. Moreover, the emulation controller 200 has a function of controlling operations by the cores 100 that execute the emulation while alternately switching the parallel execution period and the determination period. For example, the function of the emulation controller 200 is implemented by a system controller that controls operations of the multiple cores 100.

The emulation controller 200 causes the multiple cores 100 to execute the instructions in parallel (instructions converted for the cores 100) having been entered into the multiple cores 100 that execute the emulation, in the parallel execution period. The term "instruction" described hereinafter indicates an instruction converted for the core 100, unless otherwise specified. Each core 100 retains a history of the executed instruction, and suspends writing of writing data included in a writing access instruction into the main memory 300, in the parallel execution period. Next, the emulation controller 200 determines the presence or absence of a conflict among the multiple cores 100 with respect to the writing access instruction, based on the history that each core 100 retains, in the determination period. Note that, the number of the multiple cores 100 that are caused to operate in parallel in the parallel execution period is designated before the execution of the emulation.

The emulation controller 200 employs one of the cores 100 that conflict with one another with respect to the writing access instruction, as a core that is caused to execute the suspended writing access instruction (employed core), and rejects the remaining cores 100 that conflict with one another with respect to the writing access instruction (suspended cores). In other words, the emulation controller 200 selects one core 100 that is caused to execute the suspended writing access instruction. The emulation controller 200 causes the employed core 100 to execute the suspended writing access instruction and to write writing data into the main memory 300, and causes the suspended cores 100 to execute processing of returning the state of the suspended cores 100 to the state before the instructions are executed. The instructions that the suspended cores 100 have executed in the parallel execution period are cancelled.

Moreover, the emulation controller 200 employs the core 100 (non-conflict core 100) that does not conflict with respect to the writing access instruction, as a core that executes instructions (employed core). In a case where the non-conflict core 100 suspends a writing access instruction that does not conflict with that of another core 100, the emulation controller 200 causes the non-conflict core 100 to execute the suspended writing access instruction, and to write writing data into the main memory 300.

The emulation controller 200 enters new instructions to be executed in the next parallel execution period into the employed core 100 and the non-conflict core 100, and directs the suspended cores 100 to re-execute the instructions having been executed in the previous parallel execution period. The emulation controller 200 then repeatedly executes the control of the cores 100 in the parallel execution period and the control of the cores 100 in the determination period. Further, each of the multiple cores 100 is caused to execute the same number of instructions in the respective parallel execution periods. An example of the operation of the emulation controller 200 will be described from FIG. 6 to FIG. 8.

The multiple cores 100 have the same or similar configuration with one another. Each core 100 includes an emulation executing unit 10, a state managing unit 20, a memory access managing unit 30, and a rejected number retaining unit 40.

The emulation executing unit 10 includes a state temporary retaining unit 12 that successively retains information used for the execution of the emulation, such as data used for the computation and values of a register that retains a computation result. The emulation executing unit 10 executes instructions included in a part of a debug target program that is entered from the emulation controller 200, and successively retains information such as values of a register in the core 100 that vary due to the execution of the program, in the state temporary retaining unit 12. Further, the state temporary retaining unit 12 may include an element that retains information that varies due to the execution of the program, such as a register in the core 100.

When an instruction to be executed is a memory access instruction, the emulation executing unit 10 transfers the memory access instruction to the memory access managing unit 30. The memory access instruction is a writing access instruction that causes data to be written into the main memory 300 or a reading access instruction that causes data to be read from the main memory 300. When the memory access instruction is a reading access instruction, the emulation executing unit 10 receives reading data corresponding to the reading access instruction from the memory access managing unit 30.

The state managing unit 20 includes a state retaining unit 22 in which information retained in the state temporary retaining unit 12 is saved. When a group of instructions having been executed in the parallel execution period, which is described later, is selected as an execution result of the emulation, the emulation executing unit 10 saves the information retained in the state temporary retaining unit 12 to the state retaining unit 22. Moreover, when a group of instructions having been executed in the parallel execution period is not selected as an execution result of the emulation, the emulation executing unit 10 recovers information retained in the state retaining unit 22 to the state temporary retaining unit 12. This allows the emulation executing unit 10 to execute, when a group of instructions having been executed in the parallel execution period is not selected, data processing identical with the data processing having been executed in the parallel execution period, in the next parallel execution period.

The memory access managing unit 30 includes an access processing unit 32, a writing history retaining unit 34, and an access history retaining unit 36, and is connected to the main memory 300 via a bus BUS. When the access processing unit 32 receives a writing access instruction from the emulation executing unit 10 in the parallel execution period, the access processing unit 32 stores information included in the writing access instruction in the writing history retaining unit 34 and the access history retaining unit 36. Meanwhile, when the access history retaining unit 36 retains the information included in the writing access instruction, the access processing unit 32 does not store the information included in the writing access instruction in the access history retaining unit 36. The writing history retaining unit 34 and the access history retaining unit 36 are an example of a history retaining unit in which a history of the memory access instructions executed by the multiple cores 100 in the parallel execution period is stored.

Figure 4:
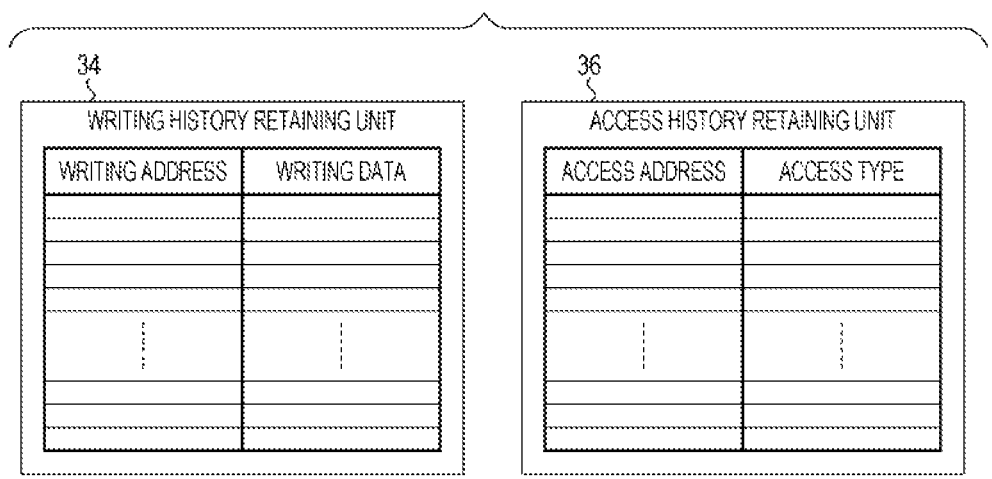
FIG. 4 is a diagram illustrating respective examples of a writing history retaining unit and an access history retaining unit, according to an embodiment.

Moreover, when the access processing unit 32 receives a reading access instruction from the emulation executing unit 10 in the parallel execution period, the access processing unit 32 reads data from the main memory 300 or the writing history retaining unit 34. The access processing unit 32 outputs the data that is read from the main memory 300 or the writing history retaining unit 34 to the emulation executing unit 10. Further, when the access processing unit 32 reads data from the main memory 300, the access processing unit 32 stores information included in the reading access instruction in the access history retaining unit 36. Examples of the writing history retaining unit 34 and the access history retaining unit 36 are illustrated in FIG. 4. An example of the operation of the access processing unit 32 will be described in FIG. 5.

The number of bits of writing data included in a writing access instruction is identical with the number of bits of data that the access processing unit 32 writes into the main memory 300 based on the writing access instruction. Moreover, the number of bits of reading data that the access processing unit 32 outputs to the emulation executing unit 10 based on a reading access instruction is identical with the number of bits of data that the access processing unit 32 reads from the main memory 300. For example, data of 8 bits (1 byte) are delivered and received both between the emulation executing unit 10 and the access processing unit 32, and between the access processing unit 32 and the main memory 300.

The rejected number retaining unit 40 includes a counter that retains the number (hereinafter, referred to as the rejected number) of groups of instructions that have been executed in the parallel execution period and that are continuously rejected as the execution result of the emulation. When the emulation executing unit 10 selects a group of instructions having been executed in the parallel execution period as an execution result of the emulation, the emulation executing unit 10 resets a value of the counter in the rejected number retaining unit 40 to an initial value. When the emulation executing unit 10 does not select a group of instructions having been executed in the parallel execution period as an execution result of the emulation, the emulation executing unit 10 updates a value of the counter in the rejected number retaining unit 40 (for example, increments by "1").

FIG. 4 illustrates examples of the writing history retaining unit 34 and the access history retaining unit 36 illustrated in FIG. 3. The writing history retaining unit 34 includes multiple entries that each store a combination of a writing address and writing data, which are included in a writing access instruction. The access history retaining unit 36 includes multiple entries that each store an access address, and an access type indicating which one of a writing access instruction and a reading access instruction the memory access instruction is. The access address is a writing address included in a writing access instruction or a reading address included in a reading access instruction.

Further, the memory access managing unit 30 illustrated in FIG. 3 may include a history retaining unit that integrates the writing history retaining unit 34 and the access history retaining unit 36 into one. In this case, each entry in the history retaining unit includes regions where an access address, an access type, and writing data are respectively stored. When information indicating a reading access instruction is stored in the region for the access type, the region for the writing data is blank.

Figure 5:
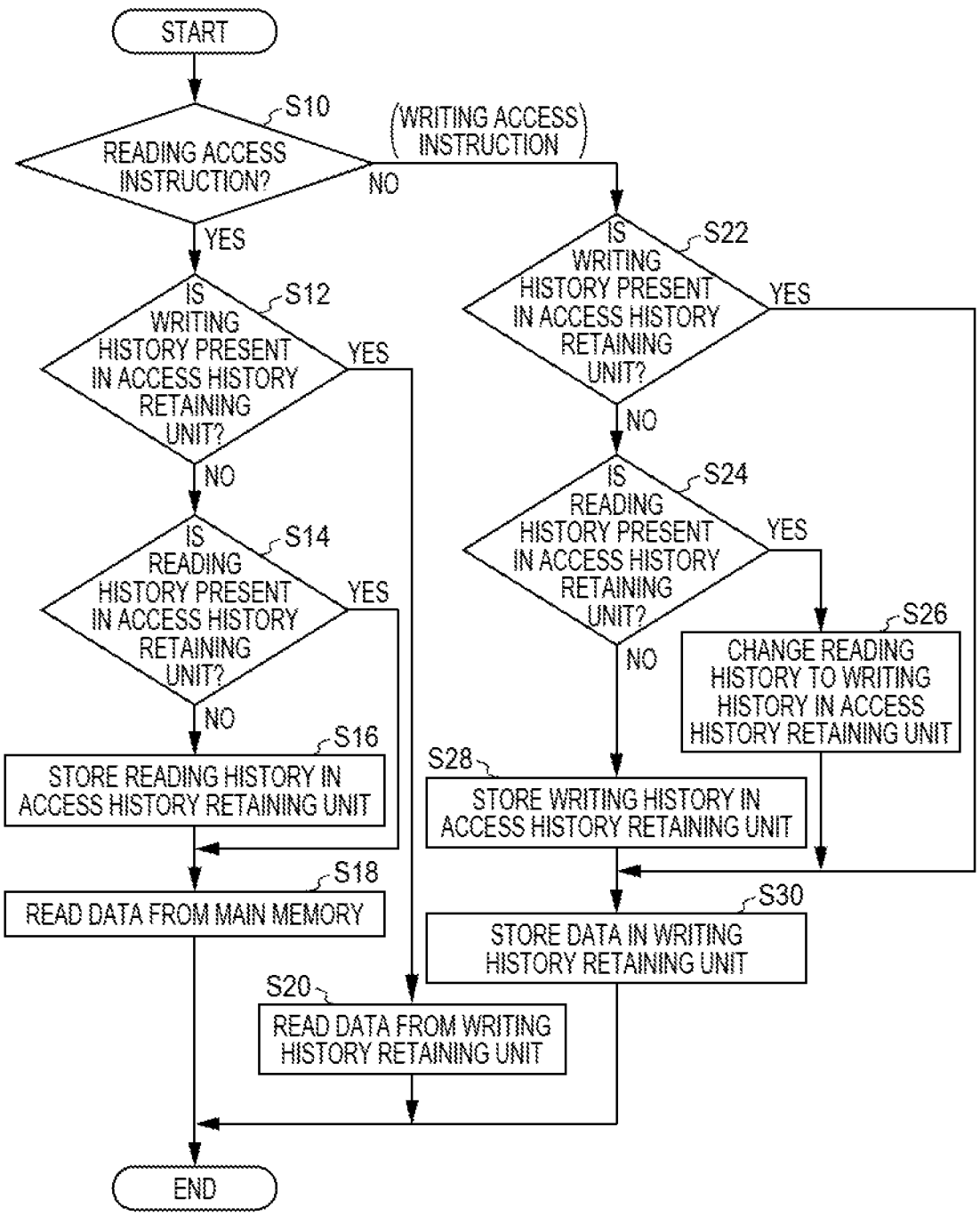
FIG. 5 is a diagram illustrating an example of an operational flowchart for an operation of an access processing unit, according to an embodiment.

FIG. 5 illustrates an example of an operational flowchart for the access processing unit 32 illustrated in FIG. 3. In other words, FIG. 5 illustrates an example of a control method of the information processing apparatus. The operation illustrated in FIG. 5 is started when the access processing unit 32 receives a memory access instruction from the emulation executing unit 10, in each of the parallel execution periods, which are described later.

Firstly, at Step S10, when the memory access instruction received from the emulation executing unit 10 is a reading access instruction, the access processing unit 32 shifts the operation to Step S12. When the memory access instruction received from the emulation executing unit 10 is a writing access instruction, the access processing unit 32 shifts the operation to Step S22.

At Step S12, when a reading address included in the reading access instruction matches one of the writing addresses retained in the access history retaining unit 36, the access processing unit 32 shifts the operation to Step S20. In other words, when a writing access instruction including a writing address identical with the reading address has already been executed in the parallel execution period, the access processing unit 32 shifts the operation to Step S20. When a reading address included in the reading access instruction matches none of the writing addresses retained in the access history retaining unit 36, the access processing unit 32 shifts the operation to Step S14.

At Step S14, when the reading address included in the reading access instruction matches one of the reading addresses retained in the access history retaining unit 36, the access processing unit 32 shifts the operation to Step S18. In other words, when in the parallel execution period, the reading address included in the reading access instruction has already been retained in the access history retaining unit 36, the access processing unit 32 shifts the operation to Step S18 so as to omit the operation at Step S16. When the reading address included in the reading access instruction matches none of the reading addresses retained in the access history retaining unit 36, the access processing unit 32 shifts the operation to Step S16. In other words, when a history of the reading access instruction is not retained in the access history retaining unit 36 in the parallel execution period, the access processing unit 32 shifts the operation to Step S16 so as to store the access history in the access history retaining unit 36.

At Step S16, the access processing unit 32 stores the reading address included in the reading access instruction received from the emulation executing unit 10 and an type indicating the reading access instruction, in a vacant entry in the access history retaining unit 36. After Step S16, the operation is shifted to Step S18.

At Step S18, the access processing unit 32 accesses the main memory 300 based on the reading access instruction received from the emulation executing unit 10, and reads data from the main memory 300. The access processing unit 32 transfers the data read from the main memory 300 to the emulation executing unit 10, and ends the operation.

At Step S20, the access processing unit 32 refers to the writing history retaining unit 34, and reads writing data from an entry that retains a writing address having the same value as the reading address included in the reading access instruction. In other words, when a writing access instruction including a writing address identical with the reading address included in the reading access instruction has already been executed in the parallel execution period, the access processing unit 32 reads data not from the main memory 300 but from the writing history retaining unit 34. The access processing unit 32 then transfers the data read from the access history retaining unit 36, as reading data corresponding to the reading access instruction, to the emulation executing unit 10, and ends the operation.

On the other hand, at Step S22, when a writing address included in the writing access instruction matches one of the writing addresses retained in the access history retaining unit 36, the access processing unit 32 shifts the operation to Step S30. In other words, when a writing access instruction including a writing address identical with the current writing address has already been executed in the parallel execution period, the access processing unit 32 shifts the operation to Step S30 so as to update the writing data in the writing history retaining unit 34. When a writing address included in the writing access instruction matches none of the writing addresses retained in the access history retaining unit 36, the access processing unit 32 shifts the operation to Step S24. In other words, when the writing address included in the writing access instruction is not retained as access address in the access history retaining unit 36 in the parallel execution period, the access processing unit 32 shifts the operation to Step S24.

At Step S24, when a writing address included in the writing access instruction matches one of the reading addresses retained in the access history retaining unit 36, the access processing unit 32 shifts the operation to Step S26. In other words, when a reading access instruction including a reading address identical with the writing address included in the writing access instruction has already been executed in the parallel execution period, the access processing unit 32 shifts the operation to Step S26. When a writing address included in the writing access instruction matches none of the access addresses retained in the access history retaining unit 36, the access processing unit 32 shifts the operation to Step S28.

At Step S26, the access processing unit 32 changes the access type of an entry that retains an address identical with the writing address included in the writing access instruction, from the reading access to the writing access in the access history retaining unit 36. After Step S26, the operation is shifted to Step S30.

At Step S28, the access processing unit 32 stores the writing address included in the writing access instruction received from the emulation executing unit 10 and the access type indicating the writing access instruction, in a vacant entry in the access history retaining unit 36. After Step S28, the operation is shifted to Step S30.

At Step S30, the access processing unit 32 writes the writing address included in the writing access instruction and the writing data into the writing history retaining unit 34, and ends the operation.

Figure 6:
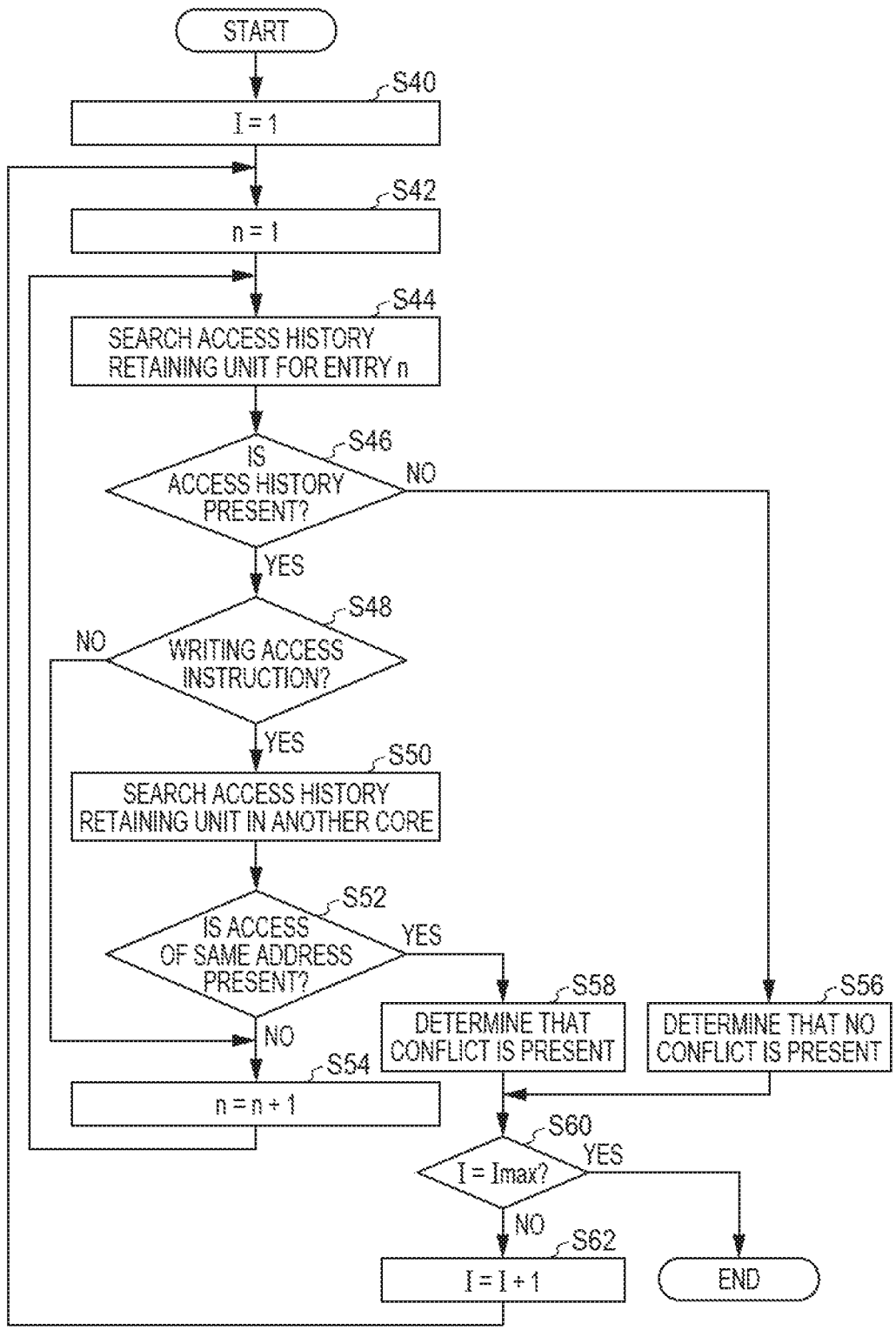
FIG. 6 is a diagram illustrating an example of an operational flowchart for an operation of an emulation controller, according to an embodiment.

FIG. 6 illustrates an example of an operational flowchart for the emulation controller 200 illustrated in FIG. 3. In other words, FIG. 6 illustrates an example of a control method of the information processing apparatus. The operation illustrated in FIG. 6 is executed in a determination period after the parallel execution period.

Firstly, at Step S40, the emulation controller 200 sets a number I of the core 100 (hereinafter, referred to as a core number I) at "1". For example, when four cores 100 are used for emulation, the core number I takes on values from "1" to "4", and a maximum value Imax is set at "4".

Next, at Step S42, the emulation controller 200 sets an entry number n of the access history retaining unit 36 in the core 100 that is identified by the core number I, at "1". For example, when the access history retaining unit 36 in each core 100 includes 100 entries, the entry number n takes on values from "1" to "100". Note that, the number of entries in the access history retaining unit 36 is set such that all the entries are not used in the parallel execution period. In other words, the number of memory access instructions executed in the parallel execution period is set at a value less than the number of entries in the access history retaining unit 36. Moreover, access histories are sequentially stored in the access history retaining unit 36 in an ascending order of the entry number n.

Next, at Step S44, the emulation controller 200 reads information retained in an entry n of the access history retaining unit 36. Next, when an access history is stored in the entry n at Step S46, the emulation controller 200 shifts the operation to Step S48. On the other hand, when no access history is stored in the entry n, the emulation controller 200 determines that information has been read from all the entries n of the access history retaining unit 36, and shifts the operation to Step S56.

At Step S48, when an access type stored in the entry n indicates a writing access instruction, the emulation controller 200 shifts the operation to Step S50 so as to determine a conflict with an instruction executed by another core 100. On the other hand, when an access type stored in the entry n does not indicate a writing access instruction (in other words, indicates a reading access instruction), the emulation controller 200 shifts the operation to Step S54 because no conflict with an instruction executed by another core 100 occurs.

At Step S50, the emulation controller 200 searches all the entries in the access history retaining unit 36 in another core 100 used for the emulation, and shifts the operation to Step S52. At Step S52, the emulation controller 200 determines whether an entry that retains an access address identical with the writing address included in the writing access instruction is present in the entries searched at Step S50. When any one of the entries searched at Step S50 retains an access address identical with the writing address included in the writing access instruction, it indicates that another core 100 has executed an instruction that conflicts with the writing access instruction. In this case, the emulation controller 200 shifts the operation to Step S58. On the other hand, when none of the entries searched at Step S50 retains an access address identical with the writing address included in the writing access instruction, it indicates that another core 100 has not executed an instruction that conflicts with the writing access instruction. In this case, the emulation controller 200 shifts the operation to Step S54.

At Step S54, the emulation controller 200 increments the entry number n by "1" so as to read information retained in the next entry of the access history retaining unit 36, and returns the operation to Step S44.

At Step S56, the emulation controller 200 determines that "no conflict is present" because another core 100 has not executed the instruction that conflicts with the writing access instruction in a loop from Step S44 to Step S54, and shifts the operation to Step S60. At Step S58, the emulation controller 200 determines that "a conflict is present" because another core 100 has executed the instruction that conflicts with the writing access instruction in the loop from Step S44 to Step S54, and shifts the operation to Step S60.

At Step S60, the emulation controller 200 ends the operation when the core number I is the maximum value Imax, whereas the emulation controller 200 shifts the operation to Step S62 when the core number I has not reached the maximum value Imax. In other words, the emulation controller 200 ends the operation when a determination about a conflict with the writing access instruction has been completed with respect to all the cores 100 that are used for the emulation. On the other hand, the emulation controller 200 shifts the operation to Step S62 when there is a core 100 for which a determination about a conflict with the writing access instruction has not been completed. At Step S62, the emulation controller 200 increments the core number I by "1" so as to determine a conflict between the writing access instruction that the next core 100 has executed and the memory access instruction that another core 100 has executed, and returns the operation to Step S42.

With the operation in the foregoing, it is determined that "a conflict is present" when there is another core 100 that has executed a writing access instruction or a reading access instruction with an address identical with the writing address included in the writing access instruction that the focused core 100 has executed. On the other hand, it is determined that "no conflict is present" when there is not another core 100 that has executed a writing access instruction or a reading access instruction with an address identical with the writing address included in the writing access instruction that the focused core 100 has executed. In addition, it is determined that "no conflict is present" when the focused core 100 has not executed a writing access instruction.

Figure 7:
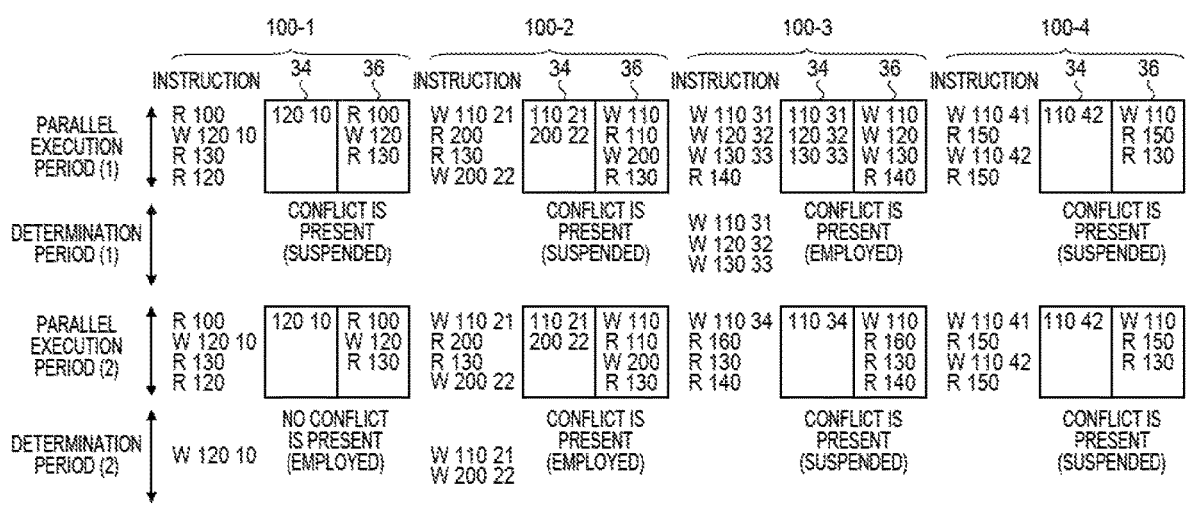
FIG. 7 is a diagram illustrating an example of an operation of an information processing apparatus, according to an embodiment.

FIG. 7 illustrates an example of an operation of the information processing apparatus IPE2 illustrated in FIG. 3. In other words, FIG. 7 illustrates an example of a control method of the information processing apparatus IPE2. In the example illustrated in FIG. 7, the emulation controller 200 distributes instructions included in a program to four cores 100-1, 100-2, 100-3, and 100-4 so as to execute the program in parallel that is a target of debugging. The emulation controller 200 alternately switches the parallel execution period and the determination period to execute the program that is a target of debugging.

The emulation controller 200 causes each core 100 to execute a predetermined number of instructions (four instructions in the example of FIG. 7) in the respective parallel execution periods. In the instructions illustrated in FIG. 7, a symbol R indicates a reading access instruction, and a group of numeric characters at the right side of the symbol R indicates a reading address. A symbol W indicates a writing access instruction, and two groups of numeric characters at the right side of the symbol W respectively indicate a writing address and writing data. Further, although the emulation controller 200 also enters a computation instruction and the like other than the memory access instruction to the cores 100 in an actual operation, FIG. 7 illustrates only memory access instructions W and R for easy understanding of an explanation.

At "R 100" that the core 100-1 executes in a parallel execution period (1), data that the main memory 300 retains is read, and information indicating "R 100" is stored in the access history retaining unit 36. At "W 120 10" that the core 100-1 executes, information indicating "W 120" is stored in the access history retaining unit 36, and information indicating "120 10" is stored in the writing history retaining unit 34. In other words, writing of data "10" into the main memory 300 in accordance with "W 120 10" is suspend. The writing history retaining unit 34 retains data that is suspended to be written into the main memory 300 without losing the data. In other words, even when instructions included in the program are executed by being distributed to the respective cores 100, data that is suspended to be written into the main memory 300 is read from the writing history retaining unit 34 to allow each core 100 to successively execute the instructions in the parallel execution period without malfunctions.

At "R 130" that the core 100-1 executes in the parallel execution period (1), data that the main memory 300 retains is read, and information indicating "R 130" is stored in the access history retaining unit 36. At "R 120" that the core 100-1 executes, data "10" retained in the writing history retaining unit 34 is read based on "W 120" retained in the access history retaining unit 36. This allows reading data to be correctly read based on "R 120", even when data "10" is suspended to be written into the main memory 300 in accordance with "W 120 10".

Information stored in the access history retaining unit 36 based on "R 200" that the core 100-2 executes in the parallel execution period (1) is changed to "W 200" based on "W 200 22" to be executed thereafter. The core 100-2 stores data "22" in the writing history retaining unit 34, instead of writing data "22" into the main memory 300 based on "W 200 22". This allows the core 100-2 to read correct data "22" from the writing history retaining unit 34 when the core 100-2 executes again a reading access instruction with respect to the address "200", without accessing the main memory 300.

Writing data "41" stored in the writing history retaining unit 34 based on "W 110 41" that the core 100-4 executes in the parallel execution period (1) is changed to "42" based on "W 110 42" to be executed thereafter. This suspends the writing to the main memory 300, and allows reading data based on "R 110" to be correctly read when, for example, "R 110" is executed thereafter.

Moreover, at a first occurrence of "R 150" that the core 100-4 executes in the parallel execution period (1), data that the main memory 300 retains is read, and information indicating "R 150" is stored in the access history retaining unit 36. Thereafter, at a second occurrence of "R 150" that the core 100-4 executes again, data that the main memory 300 retains is read. Information indicating "R 150" is not stored in the access history retaining unit 36 because "R 150" has already been retained in the access history retaining unit 36 based on the first occurrence of "R 150".

In the parallel execution period (1), "W 110 21" by the core 100-2, "W 110 31" by the core 100-3, and "W 110 41" and "W 110 42" by the core 100-4 conflict with one another. Moreover, in the parallel execution period (1), W 120 10" by the core 100-1" and "W 120 32" by the core 100-3 conflict with each other. The presence or absence of a conflict among the instructions that the cores 100-1, 100-2, 100-3, and 100-4 have executed in the parallel execution period (1) is determined in a determination period (1).

Further, in the determination period (1), the emulation controller 200 selects, as an employed core that executes instructions, the core 100-3 having the largest value out of the values retained in the rejected number retaining units 40 of the four cores 100-1, 100-2, 100-3, and 100-4 that conflict with one another. Further, the emulation controller 200 may select one out of the multiple cores 100 in which the instructions conflict with one another, by using an arbiter logic having the reproducibility, such as a round robin logic, without using the values retained in the rejected number retaining unit 40. In this case, each core 100 does not include the rejected number retaining unit 40.

Figure 8:
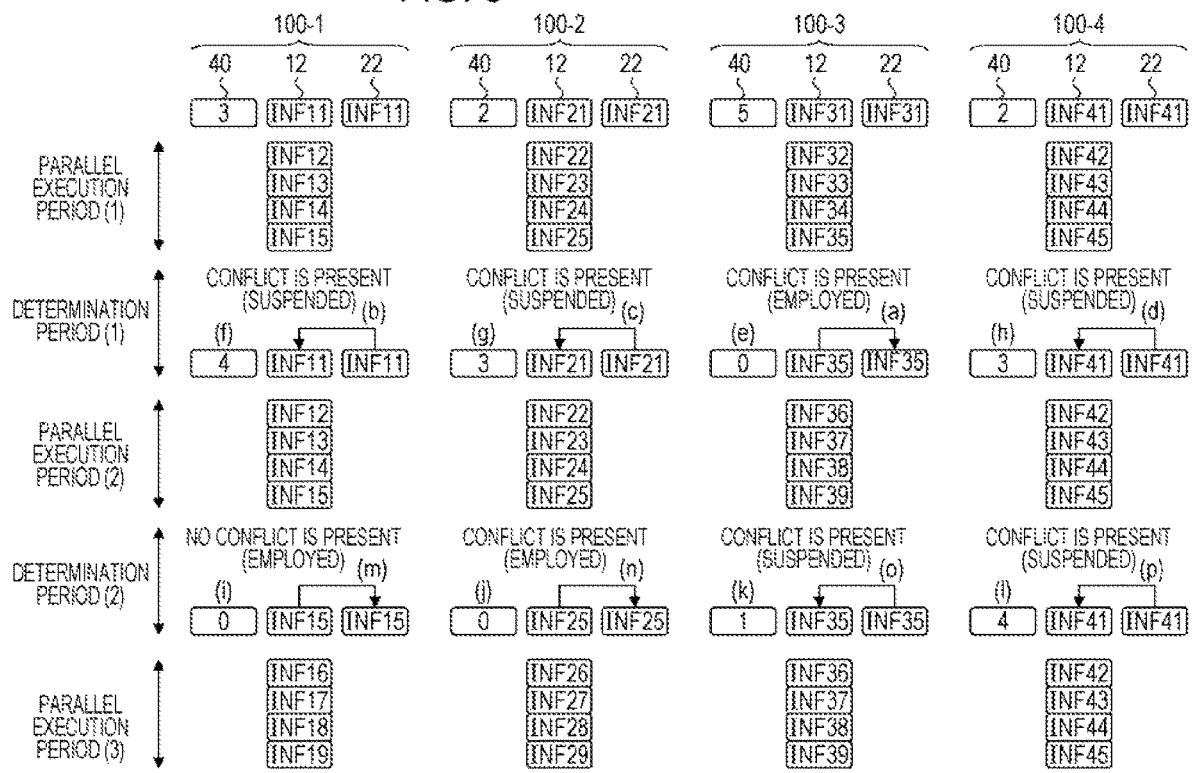
FIG. 8 is a diagram illustrating an example of changes of information retained in a rejected number retaining unit, a state temporary retaining unit, and a state retaining unit, in an operation of an information processing apparatus, according to an embodiment.

FIG. 8 illustrates values retained in the rejected number retaining unit 40. The emulation controller 200 causes the employed core 100-3 to execute writing access instructions "W 110 31", "W 120 32, and "W 130 33", exclusive of the reading access instruction "R 140", which have been executed in the parallel execution period (1). The emulation controller 200 enters new instructions to be executed in a parallel execution period (2), into the employed core 100-3. When the instructions that the multiple cores 100 have executed in the parallel execution period (1) conflict with one another, one of the multiple cores 100 in which the instructions conflict with one another is selected, thereby causing the execution order of the instructions to be consistently the same even if the program is repeatedly executed.

Moreover, the emulation controller 200 suspends the execution of instructions by the other cores (suspended cores) 100-1, 100-2, and 100-4. In other words, data that each of the suspended cores 100-1, 100-2, and 100-4 has read from the main memory 300 or the writing history retaining unit 34 in the parallel execution period (1) are abandoned.

Next, in the parallel execution period (2), the emulation controller 200 causes the suspended cores 100-1, 100-2, and 100-4 to execute the instructions identical with those in the parallel execution period (1). The emulation controller 200 causes the employed core 100-3, in which the execution of the instructions is employed in the determination period (1), to execute new instructions. Further, the emulation controller 200 erases the information stored in the writing history retaining unit 34 and the information stored in the access history retaining unit 36 before each parallel execution period is started.

In the parallel execution period (2), "W 110 21" by the core 100-2, "W 110 34" by the core 100-3, and "W 110 41" and "W 110 42" by the core 100-4 conflict with one another. The instructions that the core 100-1 has executed do not conflict with instructions that the other cores 100-2, 100-3, and 100-4 have executed. The presence or absence of a conflict among the instructions that the cores 100-1, 100-2, 100-3, and 100-4 have executed in the parallel execution period (2) is determined in the determination period (2).

In the determination period (2), assume that out of the conflicted three core 100-2, 100-3, and 100-4, the rejected numbers retained in the rejected number retaining units 40 of the cores 100-2 and 100-4 are identical with each other. Further, the rejected number retained in the rejected number retaining unit 40 of the core 100-3 is already reset to an initial value "0" in the determination period (1) when the core 100-3 is employed in the determination period (1). The emulation controller 200 selects, as an employed core that executes the instructions, the core 100-2 having a smaller core number, when the rejected numbers retained in the rejected number retaining units 40 of the cores 100-2 and 100-4 are identical with each other. The emulation controller 200 treats the cores 100-3 and 100-4 as suspended cores in which the execution of the instructions is suspended. Data that each of the suspended cores 100-3 and 100-4 has read from the main memory 300 or the writing history retaining unit 34 in the parallel execution period (2) are abandoned. Further, when values retained in the rejected number retaining units 40 of the conflicted multiple cores 100 are identical with one another, the emulation controller 200 may select a core that executes the instructions, by using an arbiter logic having the reproducibility, such as a round robin logic.

The emulation controller 200 causes the employed core 100-2 to execute the writing access instructions "W 110 21" and "W 200 22", exclusive of the reading access instructions "R 200" and "R 130", which have been executed in the parallel execution period (2).

Moreover, the emulation controller 200 causes the non-conflict core 100-1 in which the instruction does not conflict to execute the writing access instruction "W 120 10", exclusive of the reading access instructions "R 100", "R 130", and "R 120" having been executed in the parallel execution period (2). In other words, the core 100 that has executed the instructions that do not conflict with those of another core 100 in the parallel execution period is selected as a non-conflict core that unconditionally executes instructions. The core 100 having executed, in the parallel execution period, the instructions that does not conflict with those of another core 100 is selected, thereby allowing the multiple cores 100 having executed the instructions in the parallel execution period to be employed, and improving the execution efficiency of instructions compared with a case where the instructions are executed by a single core 100.

The emulation controller 200 enters new instructions into the employed core 100 and the non-conflict core 100 in the next parallel execution period, and causes the suspended cores 100 to execute instructions in the next parallel execution period that are identical with those in the previous parallel execution period.

FIG. 8 illustrates an example of changes of information retained in the rejected number retaining unit 40, the state temporary retaining unit 12, and the state retaining unit 22, in the operation of the information processing apparatus IPE2 in FIG. 7. In other words, FIG. 8 illustrates an example of a control method of the information processing apparatus.

In the parallel execution period (1), the rejected number retaining unit 40 of the core 100-1 retains "3", the rejected number retaining unit 40 of the core 100-2 retains "2", the rejected number retaining unit 40 of the core 100-3 retains "5", and the rejected number retaining unit 40 of the core 100-4 retains "2". The state temporary retaining unit 12 and the state retaining unit 22 of the core 100-1 retain information INF11, and the state temporary retaining unit 12 and the state retaining unit 22 of the core 100-2 retain information INF21. The state temporary retaining unit 12 and the state retaining unit 22 of the core 100-3 retain information INF31, and the state temporary retaining unit 12 and the state retaining unit 22 of the core 100-4 retain information INF41.

Information that is retained in the state temporary retaining unit 12 in each of the cores 100-1, 100-2, 100-3, and 100-4 varies every time an instruction is executed, based on the executed instruction. For example, the execution of four instructions in the core 100-1 causes information retained in the state temporary retaining unit 12 to successively vary starting from the information INF11 to the information INF12, INF13, INF14, and INF15.

In the determination period (1), the core 100-3 in which the execution of the instructions is employed saves, based on an instruction from the emulation controller 200, information INF35 that the state temporary retaining unit 12 retains, to the state retaining unit 22 ((a) in FIG. 8). The information INF31 that the state retaining unit 22 of the core 100-3 has retained before the parallel execution period (1) is changed to the information INF35. This allows a state of the core 100-3 to be recovered, when the execution of instructions is suspended in the next determination period (2), based on the information INF35 retained in the state retaining unit 22, to a state when the parallel execution period (2) is started.

The core 100-1 in which the execution of instructions is suspended restores, based on an instruction from the emulation controller 200, the information INF11 that the state retaining unit 22 retains, to the state temporary retaining unit 12. The information INF15 that the state temporary retaining unit 12 of the core 100-1 retains when the parallel execution period (1) is ended is changed to the information INF11 ((b) in FIG. 8). Also in each of the other cores 100-2 and 100-4 in which the execution of instructions is suspended, information that the state retaining unit 22 retains is restored to the state temporary retaining unit 12 ((c) and (d) in FIG. 8). This allows the cores 100-1, 100-2, and 100-4 to be started in the parallel execution period (2) from the state when the parallel execution period (1) is started. In other words, the suspended core 100 in which the execution of instructions is suspended executes data processing identical with the data processing based on the instruction having been executed in the previous parallel execution period.

In the determination period (1), the value of the rejected number retaining unit 40 of the core 100-3, in which the execution of the instructions is employed, is reset to the initial value "0" based on an instruction from the emulation controller 200 ((e) in FIG. 8). The rejected number retaining unit 40 of each of the cores 100-1, 100-2, and 100-4, in which the execution of the instructions is suspended, increments the retained value by "1" based on an instruction from the emulation controller 200 ((f), (g), and (h) in FIG. 8). Providing the rejected number retaining unit 40 to each core 100 allows, when the multiple cores 100 in which instructions conflict with on another are present, the employed core 100 in which the execution of the instructions is employed to be selected with a simple logic.

In the parallel execution period (2), as is illustrated in FIG. 7, the emulation controller 200 causes the cores 100-1, 100-2, and 100-4, in which the execution of instructions is suspended, to execute the instructions identical with those in the parallel execution period (1). Moreover, the emulation controller 200 causes the core 100-3, in which the execution of the instructions is employed in the determination period (1), to execute new instructions.

In the determination period (2), since values "3" retained in the rejected number retaining units 40 of the cores 100-2 and 100-4 in which instructions thereof conflict with each other are identical with each other, the emulation controller 200 selects the core 100-2 having a smaller core number as an employed core that executes instructions. When the multiple rejected number retaining units 40 retain values identical with one another, one of the cores 100 that execute instructions is selected based on a priority order set in advance to avoid the multiple cores 100 in which the instructions conflict with one another being selected as employed cores. This makes it possible to secure the reproducibility of the program even when the program that is a target of debugging is executed in parallel.

The emulation controller 200 selects the core 100-1 in which an instruction does not conflict as a core that executes the instructions. The emulation controller 200 resets the value of the rejected number retaining unit 40 of each of the cores 100-1 and 100-2 in which the execution of the instructions is employed to "0" ((i) and (j) in FIG. 8). Moreover, the emulation controller 200 increments the value retained in the rejected number retaining unit 40 of each of the cores 100-3 and 100-4 in which the execution of the instructions is suspended by "1" ((k) and (l) in FIG. 8).

Moreover, in the determination period (2), similar to the determination period (1), the cores 100-1 and 100-2 in which the execution of the instructions is employed respectively save the information INF15 and information INF25 retained in the state temporary retaining units 12 to the state retaining units 22 ((m) and (n) in FIG. 8). The cores 100-3 and 100-4 in which the execution of the instructions is suspended respectively restore the information INF35 and information INF41 retained in the state retaining units 22 to the state temporary retaining units 12 ((o) and (p) in FIG. 8). Further, in a parallel execution period (3), each of the cores 100-1 and 100-2 in which the execution of the instructions is employed executes new instructions, and each of the cores 100-3 and 100-4 in which the execution of the instructions is suspended executes again the instructions identical with those in the parallel execution period (2).

Further, even when a debug target program is repeatedly executed, in the respective parallel execution periods, the numbers of instructions that the cores 100 execute are set identical with one another, and the core 100 in which the execution of the instructions is employed is the same for each of the determination periods. In other words, even when a debug target program is repeatedly executed, the operations illustrated in FIG. 7 and FIG. 8 are reproduced. Accordingly, the execution order of the instructions included in a program is consistently made the same, and the reproducibility of the program is secured.

As in the foregoing, with the embodiment illustrated from FIG. 3 to FIG. 8, an effect similar to that of the embodiment illustrated in FIG. 1 and FIG. 2 is also obtained. In other words, in a case where the multiple cores 100 execute the instructions included in a program in parallel, a change of the execution order of the instructions is avoided, and the debug efficiency of the program is improved.

In addition, in the embodiment illustrated from FIG. 3 to FIG. 11, the rejected number retaining unit 40 is provided in each core 100 to make it possible to select one of the cores 100 in which the executed instruction is employed even when the instructions that the multiple cores 100 have been executed in the parallel execution period conflict with one another. This allows the execution order of the instructions to be consistently the same even if the program is repeatedly executed. Moreover, when the multiple rejected number retaining units 40 retain values identical with one another, one of the cores 100 that execute instructions is selected based on a priority order set in advance to avoid multiple cores 100 in which instructions thereof conflict with one another being selected as employed cores. As a result, the reproducibility of the program is secured even when the program that is a target of debugging is executed in parallel.

The core 100 having executed, in the parallel execution period, the instructions that does not conflict with those of another core 100 is unconditionally selected to allow the multiple cores 100 having executed the instructions in the parallel execution period to be employed, and the execution efficiency of the instructions to be improved compared with a case where the instructions are executed by a single core 100.

The state retaining unit 22 is provided in each core 100 to allow the suspended core 100 in which the execution of the instructions is suspended, to execute, in a state identical with the state in the previous parallel execution period, data processing identical with the data processing based on the instructions having been executed in the previous parallel execution period, in the next parallel execution period.

Information indicating a reading access instruction stored in the access history retaining unit 36 is changed based on a writing access instruction to avoid the access processing unit 32 accessing the main memory 300 when executing the reading access instruction again. Further, the core 100 reads correct data from the writing history retaining unit 34.

When a writing access instruction is executed, the access processing unit 32 stores information on the writing access instruction in the access history retaining unit 36, and stores writing data in the writing history retaining unit 34. Moreover, when a writing access instruction including an address identical with the reading address retained in the access history retaining unit 36 is executed, the access processing unit 32 changes the address retained in the access history retaining unit 36, and stores writing data in the writing history retaining unit 34. This allows the core 100 to read correct data from the writing history retaining unit 34 when the core 100 executes again a reading access instruction including the same address, without accessing the main memory 300. In other words, when instructions included in a debug target program are executed by being distributed to the multiple cores 100, the respective cores 100 successively execute the instructions in the parallel execution period without malfunctions.

Figure 9:
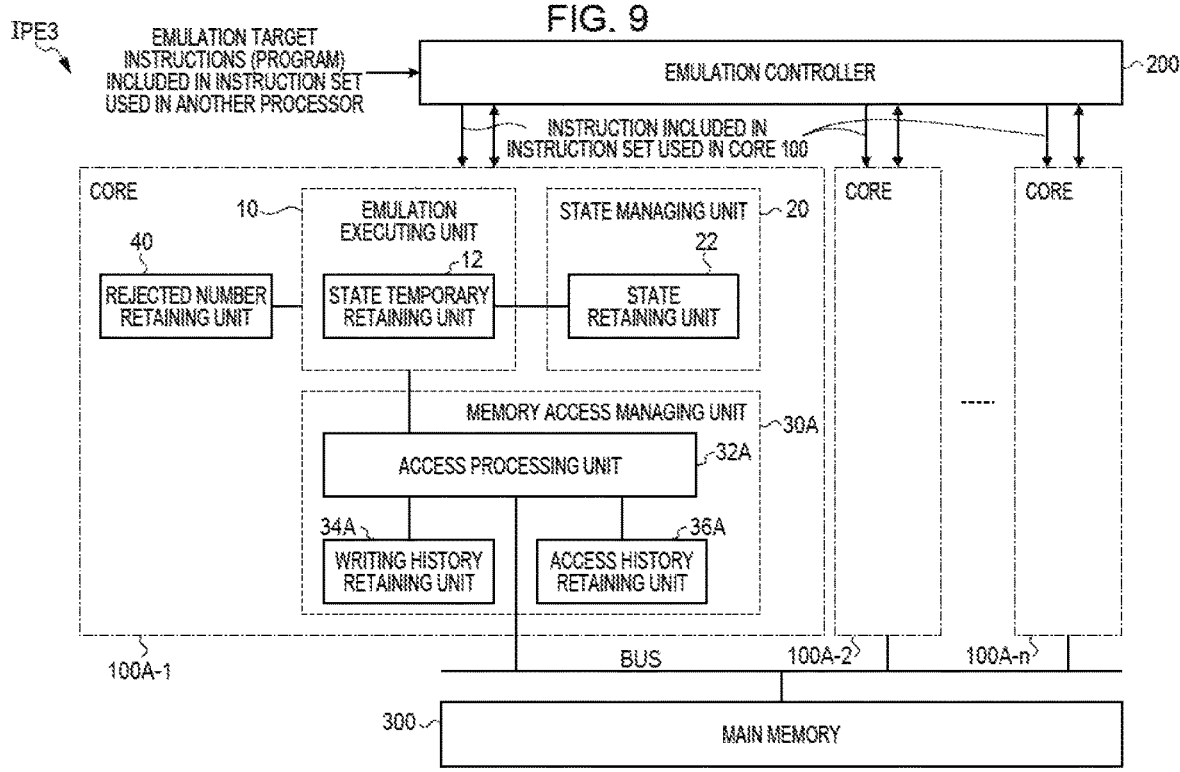
FIG. 9 is a diagram illustrating an example of an embodiment of an information processing apparatus and a control method of the information processing apparatus.

FIG. 9 illustrates still another embodiment of an information processing apparatus and a control method of the information processing apparatus. The elements the same as or similar to those described in the embodiment illustrated in FIG. 3 are assigned with the same reference numerals, and detailed explanations thereof are omitted.

An information processing apparatus IPE3 illustrated in FIG. 9 includes multiple cores 100A (100A-1, 100A-2, . . . , 100A-n) such as processor cores, the emulation controller 200, and the main memory 300. The multiple cores 100A and the emulation controller 200 may be mounted within one chip. The information processing apparatus IPE3 functions as an emulator that emulates an operation of a processor being developed or an operation of another information processing apparatus, for example, and is used for debugging of a program.

The multiple cores 100A have the same or similar configuration with one another. Each core 100A includes the emulation executing unit 10, the state managing unit 20, a memory access managing unit 30A, and the rejected number retaining unit 40. The emulation executing unit 10, the state managing unit 20, and the rejected number retaining unit 40 have functions the same or similar to those of the emulation executing unit 10, the state managing unit 20, and the rejected number retaining unit 40 illustrated in FIG. 3. The memory access managing unit 30A includes an access processing unit 32A, a writing history retaining unit 34A, and an access history retaining unit 36A, and is connected to the main memory 300 via a bus BUS.

In the information processing apparatus IPE3 illustrated in FIG. 9, the bit width of data inputted and outputted between the access processing unit 32A and the main memory 300 is larger than the bit width of operand data of a memory access instruction. For example, the access processing unit 32A writes data with a bit width larger than the bit width of writing data (operand data) included in a writing access instruction, into the main memory 300. Accordingly, the access processing unit 32A has a function of reading, based on the writing access instruction, data from the main memory 300, merging the read data with writing data, and writing the merged data into the main memory 300. Note that, the writing of the merged data into the main memory 300 is executed in the determination period illustrated in FIG. 7.

Further, the bit width of data inputted and outputted between the access processing unit 32A and the main memory 300 may vary in accordance with the electrical specification of the main memory 300 such as a memory module, in some cases. Moreover, in FIG. 9, a cache memory may be disposed between each core 100 and the main memory 300. In this case, each core 100 reads data from the cache memory, and writes data into the cache memory.

Moreover, the access processing unit 32A reads data with the number of bits larger than the number of bits of reading data (operand data) that is read based on the reading access instruction, from the main memory 300. Accordingly, the access processing unit 32A has a function of selecting, out of data read from the main memory 300, data corresponding to the reading address included in the reading access instruction, and outputting the selected data to the emulation executing unit 10.

Figure 10:
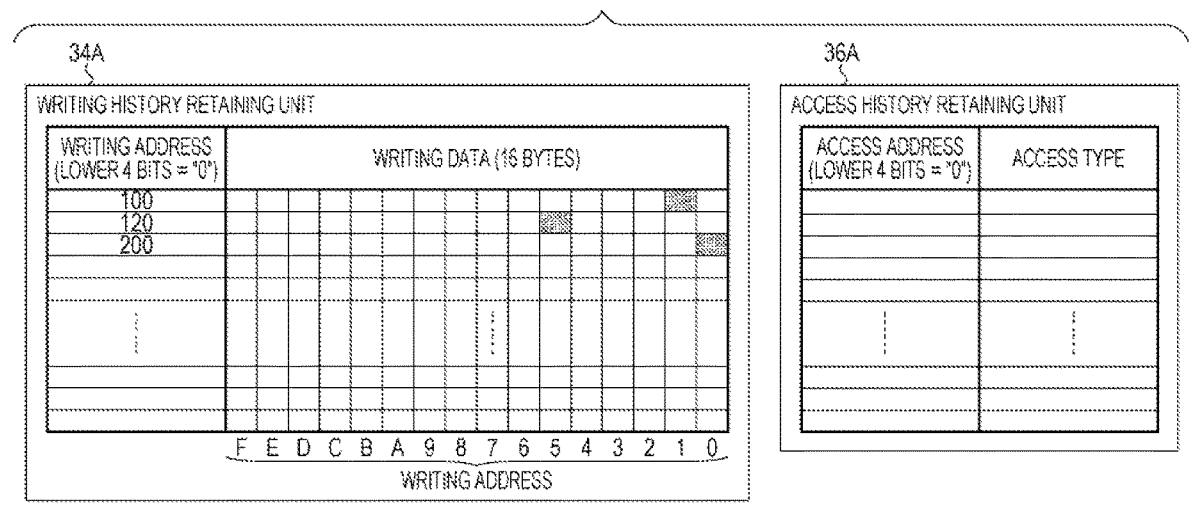
FIG. 10 is a diagram illustrating respective examples of a writing history retaining unit and an access history retaining unit, according to an embodiment.
Figure 11:
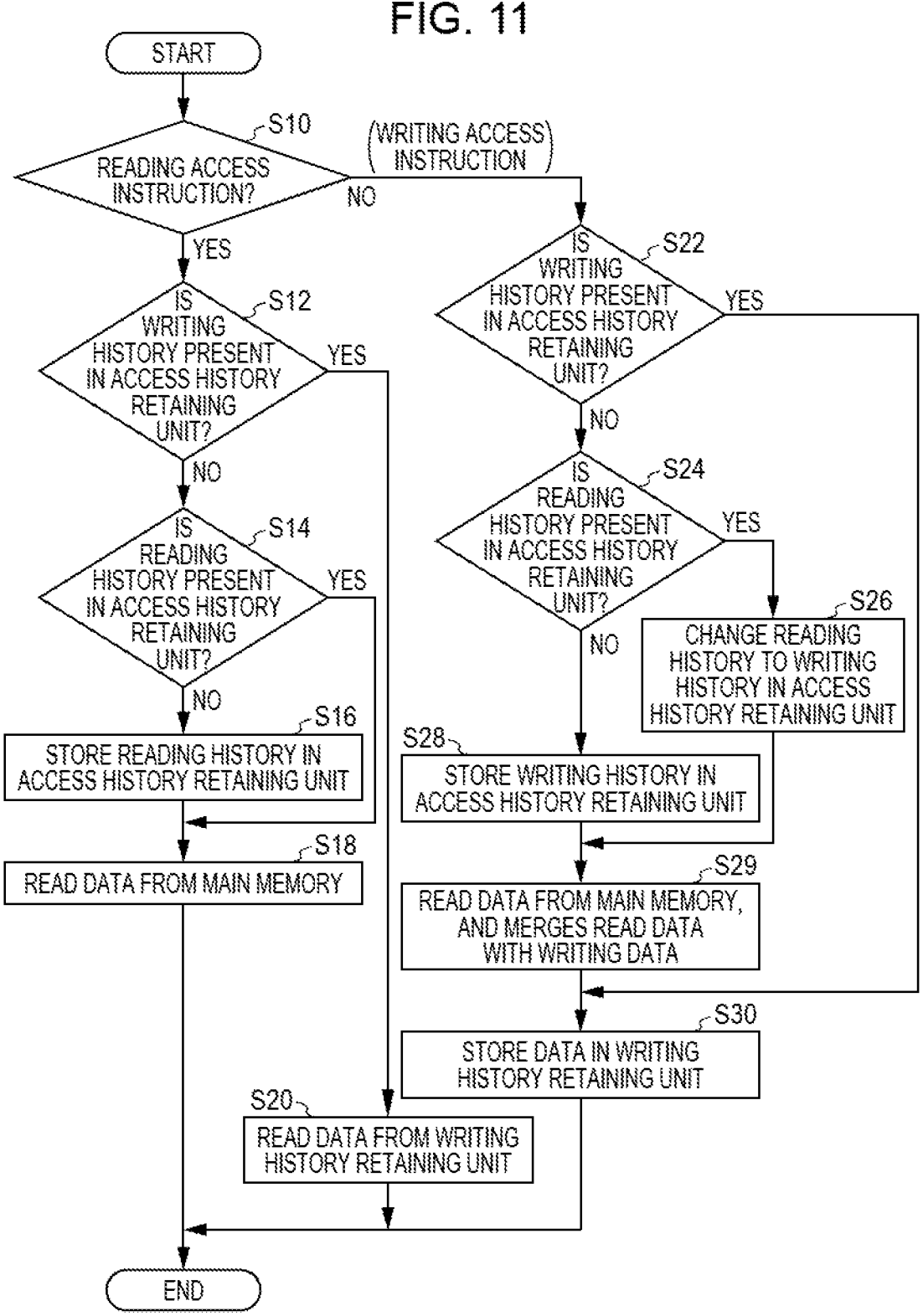
FIG. 11 is a diagram illustrating an example of an operational flowchart for an operation of an access processing unit, according to an embodiment.

For example, data of 8 bits (1 byte) is delivered and received between the emulation executing unit 10 and the access processing unit 32A, and data of 128 bits (16 bytes) is delivered and received between the access processing unit 32A and the main memory 300. The function of the access processing unit 32A is similar to the function of the access processing unit 32 illustrated in FIG. 3, exclusive of the function of merging data and the function of selecting data. An example of the operation of the access processing unit 32A is illustrated in FIG. 11. Examples of the writing history retaining unit 34A and the access history retaining unit 36A are illustrated in FIG. 10. Further, when a core 100 in which the execution of the instructions is employed is decided using an arbiter logic having the reproducibility, such as a round robin logic, out of the multiple cores 100 that conflict with one another, each core 100 includes no rejected number retaining unit 40.

FIG. 10 illustrates examples of the writing history retaining unit 34A and the access history retaining unit 36A illustrated in FIG. 9. The writing history retaining unit 34A includes multiple entries that each store a combination of an address in which lower 4 bits of a writing address included in a writing access instruction are masked to "0" and a data group of 16 bytes including writing data of 1 byte. The data group includes data that are written into a storage area allocated to an address range in which the lower 4 bits of the writing address are masked.

For example, when a writing address is "101" in hexadecimal, a writing address of "100" in hexadecimal and a data group of 16 bytes corresponding to addresses from "100" to "10F" in hexadecimal are stored in an entry. Similarly, when a writing address to be stored in an entry is "125" in hexadecimal, a writing address of "120" in hexadecimal and a data group of 16 bytes corresponding to addresses from "120" to "12F" in hexadecimal are stored in the entry. When a writing address to be stored in an entry is "200" in hexadecimal, the writing address of "200" in hexadecimal and a data group of 16 bytes corresponding to addresses from "200" to "20F" in hexadecimal are stored in the entry.

Accordingly, when the access processing unit 32A illustrated in FIG. 9 executes a writing access instruction in the parallel execution period, the access processing unit 32A outputs an address in which lower 4 bits of a writing address of writing data are masked to "0" that are illustrated in FIG. 10 by hatching, to the main memory 300. Further, the access processing unit 32A reads data of 16 bytes from the main memory 300, merges the read data with the writing data, and thereafter stores the merged data in an entry of the writing history retaining unit 34A.

The access history retaining unit 36A includes multiple entries that each stores an address in which lower 4 bits of an access address are masked to "0", and an access type indicating which one of a writing access instruction and a reading access instruction the memory access instruction is.

FIG. 11 illustrates an example of an operation of the access processing unit 32A illustrated in FIG. 9. Detailed explanations of the operations the same as or similar to those illustrated in FIG. 5 are omitted. The information processing apparatus IPE3 illustrated in FIG. 9 operates in the same way as in FIG. 7 and FIG. 8, except that an address in which lower 4 bits are masked is stored in the writing history retaining unit 34A or the access history retaining unit 36A, and data of 16 bytes is stored in the writing history retaining unit 34A.

The operations with respect to a reading access instruction from Step S10 to Step S20 are similar to the operations from Step S10 to Step S20 illustrated in FIG. 5, except that, at Step S12 and at Step S14, the access processing unit 32A executes a determination by using a value in which lower 4 bits of an address are masked to "0". Moreover, at Step S16, the access processing unit 32A stores a value in which lower 4 bits of a reading address are masked to "0" in the access history retaining unit 36A. At Step S18, the access processing unit 32A transfers, out of data of 16 bytes read from the main memory 300, the data of 1 byte corresponding to the reading address to the emulation executing unit 10.

The operations of the access processing unit 32A at Step S22 and Step S24 are similar to the operations at Step S22 and Step S24 illustrated in FIG. 5 except that a determination is executed using a value in which lower 4 bits of an address are masked to "0".

In other words, at Step S24, when a value in which lower 4 bits of a writing address are masked to "0" matches one of reading addresses (access addresses) retained in the access history retaining unit 36A, an operation at Step S26 is executed. The operation at Step S26 is similar to the operation at Step S26 illustrated in FIG. 5. After Step S26, the operation is shifted to Step S29. On the other hand, at Step S24, when a value in which lower 4 bits of a writing address are masked to "0" matches none of reading addresses (access addresses) retained in the access history retaining unit 36A, an operation at Step S28 is executed.

At Step S28, the access processing unit 32A stores the value in which lower 4 bits of the writing address are masked to "0", and an access type indicating a writing access instruction, in a vacant entry in the access history retaining unit 36A. After Step S28, the operation is shifted to Step S29.

At Step S29, the access processing unit 32A outputs a reading access instruction including the address in which the lower 4 bits of the writing address are masked to "0" to the main memory 300, and read data of 16 bytes from the main memory 300. The access processing unit 32A merges the data of 16 bytes read from the main memory 300 with writing data, and shifts the operation to Step S30.

At Step S30, the access processing unit 32A writes the address in which the lower 4 bits of the writing address are masked to "0", and the writing data or the data of 16 bytes, in which the writing data is merged, into the writing history retaining unit 34A, and ends the operation.

In other words, at Step S24, when a value in which lower 4 bits of a writing address are masked to "0" matches one of reading addresses retained in the access history retaining unit 36A, the writing data is merged with the data read from the main memory 300. Further, the merged data is stored in the writing history retaining unit 34A. On the other hand, at Step S24, when a value in which lower 4 bits of a writing address are masked to "0" matches none of reading addresses retained in the access history retaining unit 36A, a writing history is stored in the access history retaining unit 36A. Further, the writing data is merged with the data read from the main memory 300, and the merged data is stored in the writing history retaining unit 34A.

This makes it possible to implement the operation illustrated in FIG. 7 and FIG. 8 also in a case where the bit width of data inputted and outputted between the access processing unit 32A and the main memory 300 is larger than the bit width of operand data of a memory access instruction. For example, information indicating a reading access instruction stored in the access history retaining unit 36A is changed based on a writing access instruction to avoid the access processing unit 32A accessing the main memory 300 when executing the reading access instruction again.

As in the foregoing, with the embodiment illustrated from FIG. 9 to FIG. 11, an effect similar to that of the embodiment illustrated from FIG. 1 to FIG. 8 is obtained, also in a case where the bit width of data inputted and outputted between the access processing unit 32A and the main memory 300 is larger than the bit width of operand data of a memory access instruction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a plurality of instruction execution processors each configured to execute instructions included in a first instruction set;
a control processor configured to control a emulation operation including:
converting second instructions to be emulated, included in a second instruction set different from the first instruction set, into first instructions included in the first instruction set, and
entering the converted first instructions into the plurality of instruction execution processors; and
a memory accessible by each of the plurality of instruction execution processors, wherein
each instruction execution processor is configured to:
execute, out of a first part of the first instructions that are entered from the control processor, a writing access instruction to perform a writing access to the memory and a reading access instruction to perform a reading access to the memory, in a parallel execution period in which each instruction execution processor executes the first instructions in parallel with other instruction execution processors,
retain execution histories of memory access instructions including the writing access instruction and the reading access instruction, which have been executed in the parallel execution period, and
suspend writing of data into the memory caused by the writing access instruction executed in the parallel execution period;
and
the control processor is configured to:
after the parallel execution period, select, based on the execution histories of the plurality of instruction processors, a first instruction execution processor from among a group of instruction execution processors in which a first memory access instruction and a second memory access instruction including a same memory address have been executed respectively by different instruction execution processors in the parallel execution period, the first memory access instruction being the writing access instruction, the second memory access instruction being one of the writing memory access instruction and the reading access instruction,
cause the selected first instruction execution processor to complete the writing of the data into the memory, based on the writing access instruction that has been executed by the first instruction execution processor in the parallel execution period,
enter a second part of the first instructions to be executed in a next parallel execution period into the first instruction execution processor, and
cause a second instruction execution processor different from the first instruction execution processor, to re-execute the first part of the first instructions that have been executed by the second instruction execution processor in the parallel execution period, in the next parallel execution period.

2. The apparatus of claim 1, wherein
each of the plurality of instruction execution processors includes a rejection counter holding a value indicating a number of times re-execution of the first part of the first instructions has been determined, and
the control processor is further configured to:
after the parallel execution period, select from among the group of instruction execution processors, as the first instruction execution processor, an instruction execution processor whose rejection counter holds a value larger than any other instruction execution processor among the group of instruction execution processors, and
reset the rejection counter of the selected first instruction execution processor to an initial value, and update the rejection counter of each of the group of instruction execution processors other than the first instruction execution processor.

3. The apparatus of claim 2, wherein
when values of the rejection counters of the group of instruction execution processors are identical with each other, the control processor selects, as the first instruction execution processor, an instruction execution processor from among the group of instruction execution processors, according to a priority order that is set in advance.

4. The apparatus of claim 1, wherein
after the parallel execution period, the control processor causes a third instruction execution processor for which an address of the memory access instruction does not conflict with instruction execution processors other than the third instruction execution processor, to execute the suspended writing of the data into the memory, based on the retained execution histories, and enters the second part of the first instructions to be executed in the next parallel execution period, into the third instruction execution processor.

5. The apparatus of claim 1, wherein
each instruction execution processor is configured to retain a state of the each instruction execution processor when the parallel execution period is started, and
the control processor restores the second instruction execution processor for which the re-execution of the first part of the first instructions has been determined, to the state retained by the second instruction execution processor, after the parallel execution period.

6. The apparatus of claim 1, wherein
the control processor causes each of the plurality of instruction execution processors to execute a same number of the first instructions in the parallel execution period.

7. The apparatus of claim 1, wherein
each instruction execution processor changes, when a writing address included in the writing access instruction that is executed in the parallel execution period is retained in the execution history as a reading address included in the reading access instruction, information indicating the reading access instruction retained in the execution history to information indicating the writing access instruction, and stores writing data included in the writing access instruction in the execution history.

8. The apparatus of claim 1, wherein
each instruction execution processor rewrites, when a writing address included in the writing access instruction that is executed in the parallel execution period is retained in the execution history as a writing address included in another writing access instruction, writing data retained in the execution history to writing data included in the writing access instruction.

9. The apparatus of claim 1, wherein
each instruction execution processor reads, when a reading address included in the reading access instruction that is executed in the parallel execution period is retained in the execution history as a writing address included in the writing access instruction, writing data retained in the execution history as reading data for the reading access instruction.

10. The apparatus of claim 1, wherein
when an address included in the writing access instruction executed by one of the plurality of instruction execution processors is identical with an address included in a writing access instruction or a reading access instruction executed by another one of the plurality of instruction execution processors, the control processor determines the one of the plurality of instruction execution processors to be an instruction execution processor for which a confliction of addresses of the memory access instructions has occurred.

11. The apparatus of claim 1, wherein
a bit width of data inputted and outputted between each instruction execution processor and the memory is larger than a bit width of operand data of a memory access instruction; and
each instruction execution processor rewrites, when a writing address included in the writing access instruction that is executed in the parallel execution period is retained in the execution history as a reading address included in a reading access instruction, information indicating the reading access instruction retained in the execution history to information indicating the writing access instruction, reads data from the memory by using the writing address included in the writing access instruction, merges the read data with writing data included in the writing access instruction, and stores the merged data in the execution history.

12. The apparatus of claim 11, wherein
each instruction execution processor stores, when a writing address included in the writing access instruction that is executed in the parallel execution period is not retained in the execution history, information indicating the writing access instruction in the execution history, reads data from the memory by using the access address included in the writing access instruction, merges the read data with writing data included in the writing access instruction, and stores the merged data in the execution history.

13. The apparatus of claim 1, wherein
when a writing address included in the writing access instruction that is executed in the parallel execution period is not retained in the execution history, each instruction execution processor stores information indicating the writing access instruction and writing data included in the writing access instruction in the execution history.

14. The apparatus of claim 1, wherein
each instruction execution processor reads, when an access address included in the reading access instruction that is executed in the parallel execution period is retained in the execution history as an access address included in another reading access instruction, data from the memory according to the reading access instruction.

15. The apparatus of claim 1, wherein
each instruction execution processor stores, when an access address included in the reading access instruction that is executed in the parallel execution period is not retained in the execution history, information indicating the reading access instruction and the access address included in the reading access instruction in the execution history, and reads data from the memory according to the reading access instruction.

16. The apparatus of claim 1, wherein
the execution history is configured to include:
a writing history that retains a writing address and writing data both of which are included in the writing access instruction that is executed in the parallel execution period; and
an access history that retains a type of a memory access instruction that is executed in the parallel execution period and an access address included in the memory access instruction.

17. A method of an information processing apparatus including a plurality of instruction execution processors, a control processor, and a memory accessible by each instruction execution processor, the method comprising:
executing, by each instruction execution processor, instructions included in a first instruction set;
controlling, by the control processor, a emulation operation including:
converting second instructions to be emulated, included in a second instruction set different from the first instruction set, into first instructions included in the first instruction set, and
entering the converted first instructions into the plurality of instruction execution processors;
executing, by each instruction execution processor, out of a first part of the first instructions that are entered from the control processor, a writing access instruction to perform a writing access to the memory and a reading access instruction to perform a reading access to the memory, in a parallel execution period in which each instruction execution processor executes the first instructions in parallel with other instruction execution processors;
retaining, by each instruction execution processor, execution histories of memory access instructions including the writing access instruction or the reading access instruction, which has been executed in the parallel execution period;
suspending, by each instruction execution processor, writing of data into the memory caused by the writing access instruction executed in the parallel execution period;
after the parallel execution period, selecting, by the control processor, based on the execution histories, a first instruction execution processor from among a group of instruction execution processors in which a first memory access instruction and a second memory access instruction including a same memory address have been executed respectively by different instruction execution processors in the parallel execution period, the first memory access instruction being the writing access instruction, the second memory access instruction being one of the writing memory access instruction and the reading access instruction;
causing, by the control processor, the selected first instruction execution processor to complete the writing of the data into the memory, based on the writing access instruction that has been executed by the first instruction execution processor in the parallel execution period,
entering, by the control processor, a second part of the first instructions to be executed in a next parallel execution period into the first instruction execution processor; and
causing, by the control processor, a second instruction execution processor different from the first instruction execution processor, to re-execute the first part of the first instructions that have been executed by the second instruction execution processor in the parallel execution period, in the next parallel execution period.

* * * * *